(12) United States Patent
Doshi et al.

(10) Patent No.: US 12,483,889 B2
(45) Date of Patent: Nov. 25, 2025

(54) METHODS, APPARATUS AND SYSTEMS TO ENFORCE DATA BOUNDARIES THROUGH THE USE OF BOUNDARY LABELS

(71) Applicant: Intel Corporation, Santa Clara, CA (US)

(72) Inventors: Kshitij Doshi, Tempe, AZ (US); Ned M. Smith, Beaverton, OR (US); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 674 days.

(21) Appl. No.: 17/033,485

(22) Filed: Sep. 25, 2020

(65) Prior Publication Data

US 2021/0157848 A1 May 27, 2021

(51) Int. Cl.

| | |
|---|---|
| G06F 21/62 | (2013.01) |
| G06F 16/901 | (2019.01) |
| G06F 16/907 | (2019.01) |
| G06F 18/214 | (2023.01) |
| H04W 12/08 | (2021.01) |

(52) U.S. Cl.
CPC ........ H04W 12/08 (2013.01); G06F 16/9014 (2019.01); G06F 16/907 (2019.01); G06F 18/2155 (2023.01); G06F 21/62 (2013.01)

(58) Field of Classification Search
CPC .............................. G06F 18/2155; G06F 21/62
See application file for complete search history.

(56) References Cited

U.S. PATENT DOCUMENTS

2010/0333116 A1* 12/2010 Prahlad ................. G06F 3/0649
  713/153
2014/0258227 A1   9/2014 Muguda
(Continued)

FOREIGN PATENT DOCUMENTS

CN          109033444          12/2018

OTHER PUBLICATIONS

Lamping et al., "A fast, minimal memory, consistent hash algorithm," in arXiv: 1406.2294 (2014), available at https://arxiv.org/ftp/arxiv/papers/1406/1406.2294.pdf, (12 pages).
(Continued)

*Primary Examiner* — Nelson S. Giddins
(74) *Attorney, Agent, or Firm* — Hanley, Flight & Zimmerman, LLC

(57) ABSTRACT

An apparatus of an edge gateway disclosed herein includes an access evaluator to determine whether a data access attempt, if permitted, will cause data specified in the data access attempt to cross a data boundary, the data boundary associated with at least one condition to be met before the data specified in the data access attempt will be permitted to cross the boundary. The apparatus further includes an operations determiner to determine an operation to be applied to the data for which access is being attempted, in response to determining the data access attempt will cause the data to cross the data boundary, and an operation applier to apply the operation to the data. The application of the operation to the data causes the condition to be met, so that the data access occurs in conformance with the condition.

23 Claims, 21 Drawing Sheets

(56) References Cited

U.S. PATENT DOCUMENTS

| | | | |
|---|---|---|---|
| 2016/0205110 A1* | 7/2016 | Roth | G06F 9/455 |
| | | | 726/7 |
| 2018/0063082 A1* | 3/2018 | Nenov | H04L 63/0236 |
| 2018/0260583 A1* | 9/2018 | Doerner | H04L 69/40 |
| 2019/0052523 A1* | 2/2019 | Jawaharlal | H04L 12/282 |
| 2020/0021594 A1* | 1/2020 | Arregoces | H04L 63/102 |
| 2020/0076811 A1 | 3/2020 | Rudden et al. | |
| 2021/0044567 A1* | 2/2021 | Hu | H04L 63/20 |

OTHER PUBLICATIONS

European Patent Office "Extended European Search Report" issued in related EP application No. 21192858.5, mailed Jan. 24, 2022, 10 pages.
European Patent Office, "Communication under Rule 71(3) EPC—Intention to Grant," issued in connection with European Patent Application No. 21 192 858.5, dated Jan. 2, 2025, 8 pages.

* cited by examiner

METHODS, APPARATUS AND SYSTEMS TO ENFORCE DATA BOUNDARIES THROUGH THE USE OF BOUNDARY LABELS

FIELD OF THE DISCLOSURE

This disclosure relates generally to network computing and, more particularly, to methods, apparatus, and systems to enforce data boundaries through the use of boundary labels.

BACKGROUND

In recent years, edge compute nodes have been used to provide access to greater amounts of data (both sensitive and not sensitive). Existing methods to control access to such data typically are numerous and are called upon to ensure data reaches authorized devices/users while, at the same time, attempting to prevent data theft and data spillage (inadvertent data release).

BRIEF DESCRIPTION OF THE DRAWINGS

The figures are not to scale. In general, the same reference numbers will be used throughout the drawing(s) and accompanying written description to refer to the same or like parts.

Figure 1:
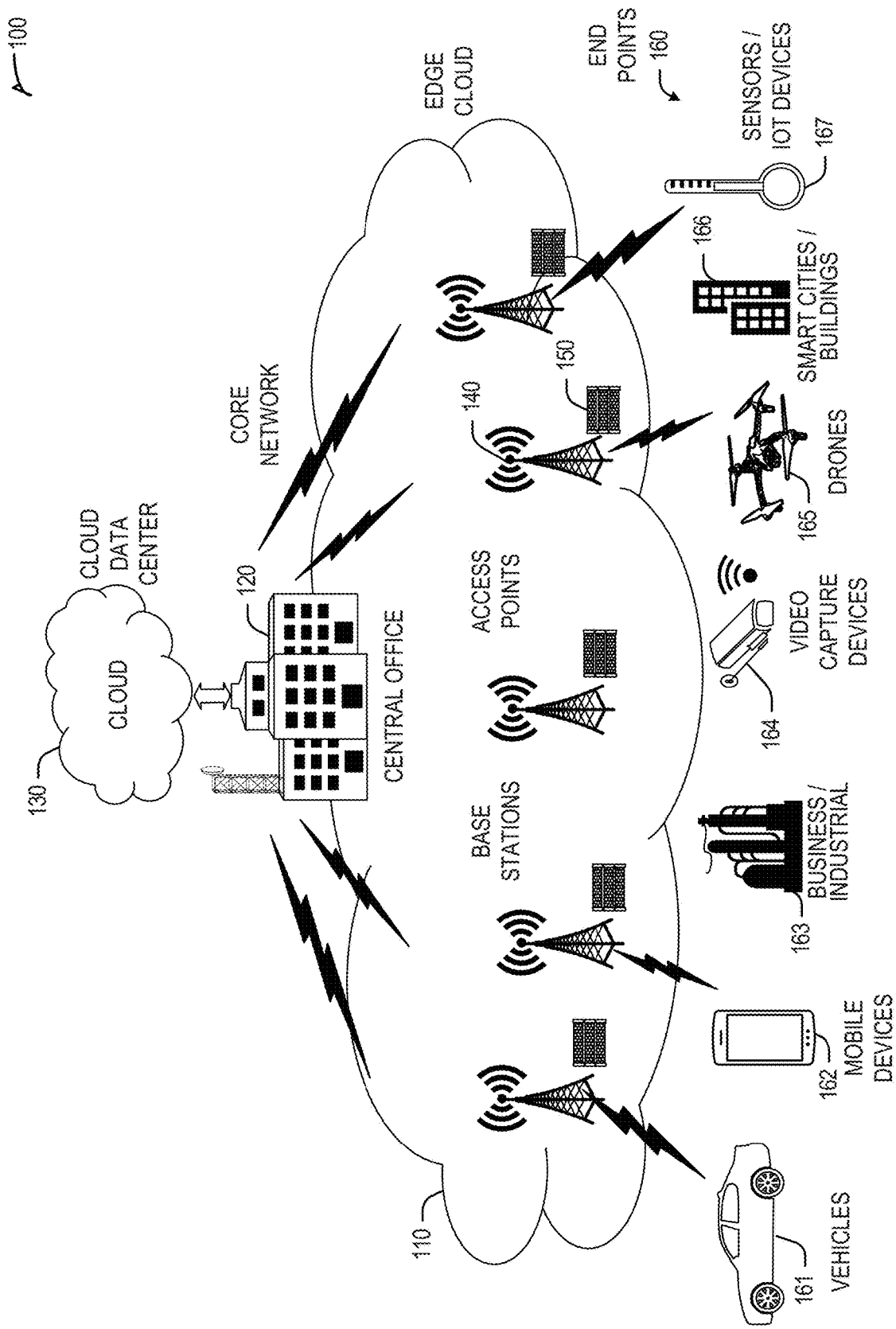
FIG. 1 illustrates an overview of an edge cloud configuration for edge computing.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Information security is a multi-headed monster in edge computing due to a number of factors. For example, challenges in securing data access is compounded by an increasing sensitivity about the adverse operational, strategic, financial, and legal consequences if information loss/theft occurs. Further, the challenges of maintaining information security is heightened by the thirst for ever-increasing amounts of data about everyone and everything and the desire to readily access that data in real-time or near real time. Amidst this explosion of data, information security attacks are increasing in sophistication, scale, and speed. New regulations, such as the GDPR, also create new burdens (responsibilities) for maintaining data that is collected, stored, and mined. Additionally, there are practical limitations on the opportunities to filter and transform data for protection when latency expectations are becoming more and more "real-time", while throughput demands are high. At the same time, when a weak link has been identified in a data flow, the speed at which the weakness can be further exploited has shrunk considerably.

There are other challenges as well—for example, edge clouds don't have well-defined perimeters or static topologies. As 5G and 6G technologies are implemented and computing becomes increasingly ubiquitous, it becomes extremely challenging to protect against intentional or accidental loss of sensitive information, and to monitor, analyze, debug, audit, or prove that information did not leak from a perimeter where stronger privacy provisions apply versus through a perimeter having weaker privacy provisions.

Additionally, centralizing control over transmission and transformation of information to ensure non-violation of privacy, integrity, and authorized access is not an option. Not only is such an approach impractical, it gets in the way of too many efficiencies—from caching, to load-balancing, to scalable and decentralized provisioning of data and resources.

The methods, apparatus, systems, and techniques disclosed herein overcome many of the challenges associated with existing methods of data/information security by attaching data boundaries to the data itself. Thus, when data is moved through a network (e.g., via an edge node) the data boundary traveling with the data is checked to ensure that sensitive data cannot cross the data boundary (also referred to herein as a boundary). In some examples, the data boundaries are referred to as labels and are represented using metadata. In some examples, the boundary identifies policies/conditions that govern where the data may (or may not) go. By evaluating the movement of the data at the edge node (e.g., edge gateways), access to the data can be securely controlled.

In some examples, the boundary labels are an integral part of the data to which the boundaries apply whether the data is cached, stored, transformed, compressed, access-traced, sectioned (projected into a smaller dimension, or sub-selected), augmented, etc. In some examples, the boundary is evaluated in connection with other information using a computation that identifies when a boundary crossing is sensitive. A sensitive boundary is a boundary that requires that one or more conditions be met before the data can pass that boundary. In some examples, the data to be accessed is transformed so that the conditions can be met. In some such examples, the transformed data constitutes a new data object for which a new boundary is generated and to which the new boundary is attached.

In the methods, apparatus and systems disclosed herein, the concept of a boundary associated with information/data is used to control a flow of the information/data from a first entity (principal A) to a second entity (principal B) not on the basis of who principal A is and who principal B is but rather based on a number of factors including, for example, a role, a context, a location, an affiliation between principal and principal B, the information/data being transmitted between principal A and principal B, etc. To examine the boundary and ensure that the flow of the information is permissible, a data access intermediary service is introduced as well as a boundary label associated with the information. The data access intermediary service consults the label associated with the information to determine whether the entity seeking to obtain the information is to be permitted to do so. In this way, the data access intermediary service disclosed herein operates as a traffic cop that oversees the flow of information/data traffic. In some examples, a user may wish to control data that is supplied to the user's home network, home computer devices, portable devices, etc. In some such examples, the boundary label may include information identifying the user and one or more policies may be defined to govern when data is to be permitted to cross a boundary associated with the user devices mentioned above. In this way, a user's electronic devices (e.g., home electronic devices, car electronic devices, etc.) can be associated with a boundary across which only types of data specified in an associated policy (by the user) may cross.

The methods, apparatus, and systems disclosed herein are used to implement a new concept of "SOFTWARE DEFINED DATA PARTITIONS" (SDDP). Thus, instead of using software defined networks, the methods, apparatus, and systems disclosed herein implement software defined data partitions that control, through the use of boundaries, the flow of information/data through a network. Instead of requiring strict overlay that are typically used for partitioning network traffic in SDN into different virtual private flows (which are often too inflexible—particularly for ad-hoc sharing of data, and expensive in requiring encryption, authentication, etc. The methods, apparatus and systems disclosed herein are about data being defined by descriptors (e.g., boundary labels/boundary metadata) which are strongly attached to data, and protocols that control and alter flow of information/data through a network in accordance with those descriptors. Further, although in conventional data systems, once information/data has been downloaded from a site, further control over that information is no longer the responsibility of anyone. Using the methods, apparatus, and systems disclosed herein, the boundary label, by traveling with the data, continues to control the information and whether the information is permitted to flow.

As is described further below, boundary labels are metadata that is derived and computed just like any other types of data that are subject to computations. A label placed over (or traveling with) any data object is not used as is to make routing decisions, but instead used to compute, or to consult a database, to get an indication, at runtime, whether or not that data can be received by a given entity; and if it cannot be received as is, then what sub-part of that data object can be received by that given entity.

In some examples, hardware acceleration can be used via the use of a filtering mechanism implemented in smart network interface cards (NICs) with hardware level attestation of the NIC so that the NIC can be delegated the responsibility of ensuring (a) that a DATA packet is not moved where it is not permitted to go, and (b) THAT the link between metadata (label) and data is not severed. The advantages of the methods, systems, apparatus and techniques become apparent in connection with the figures described below.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office, etc.). However, the closer that the edge location is to the endpoint (e.g., user equipment (UE)), the more that space and power is often constrained. Thus, edge computing attempts to reduce the amount of resources needed for network services, through the distribution of more resources that are located closer (both geographically and in network access time) to the endpoint devices. In this manner, edge computing attempts to bring the compute resources to the workload data, where appropriate, or bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
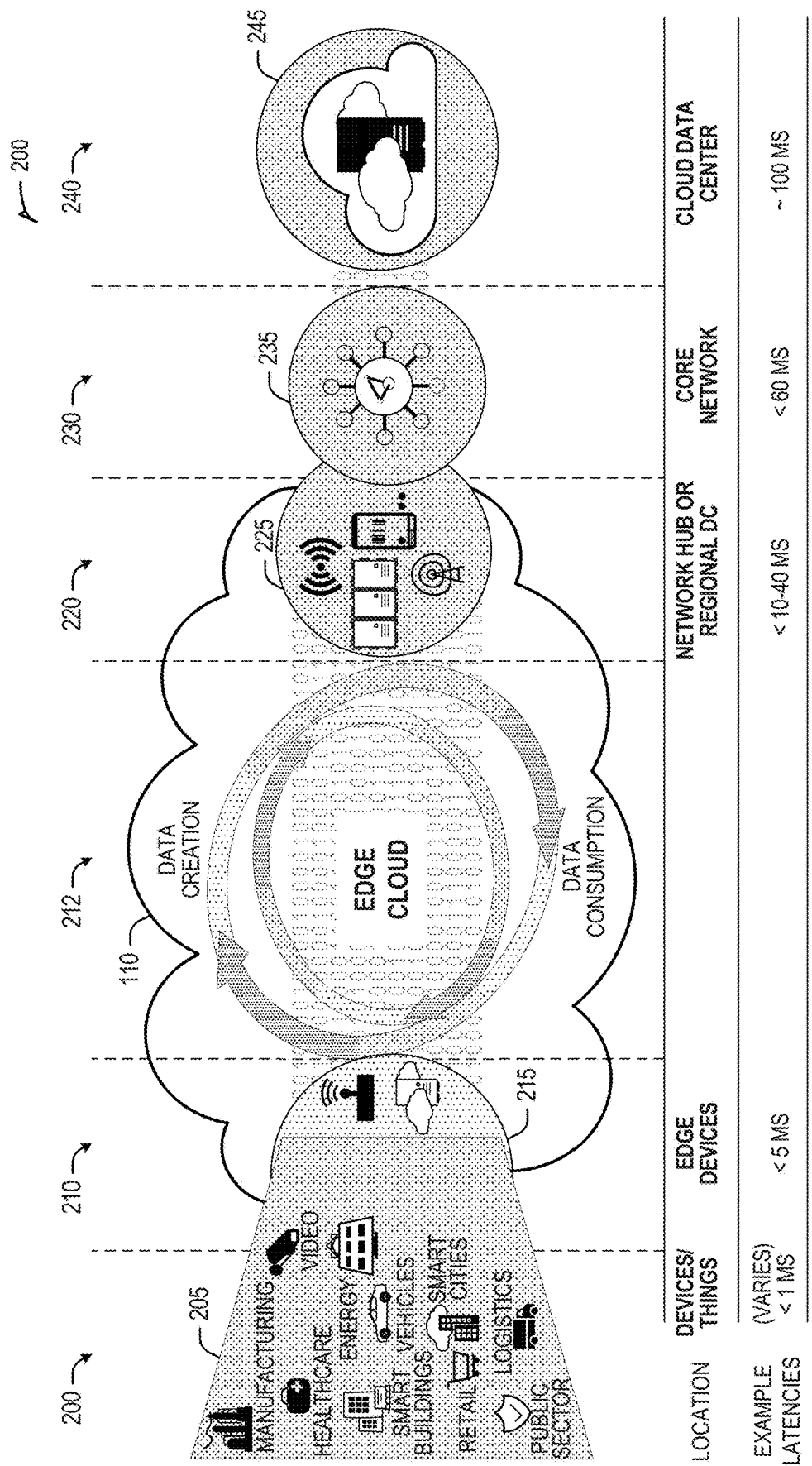
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC) or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer. As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge", layers, relative to a network source and destination. For instance, from the perspective of the core network data center 235 or a cloud data center 245, a central office or content data network may be considered as being located within a near edge layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205. For example, in some examples, there are more network hops between the cloud and a "far edge" layer than between the cloud and a "near edge" layer.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be able to tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may be an appliance computing device that is a self-contained processing system including a housing, case, or shell. In some cases, edge devices are devices presented in the network for a specific purpose (e.g., a traffic light), but that have processing or other capacities that may be harnessed for other purposes. Such edge devices may be independent from other networked devices and provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 18B. The edge cloud 110 may also include one or more servers and/or one or more multi-tenant servers. Such a server may implement a virtual computing environment such as a hypervisor for deploying virtual machines, an operating system that implements containers, etc. Such virtual computing environments provide an execution environment in which one or more applications may execute while being isolated from one or more other applications.

Figure 3:
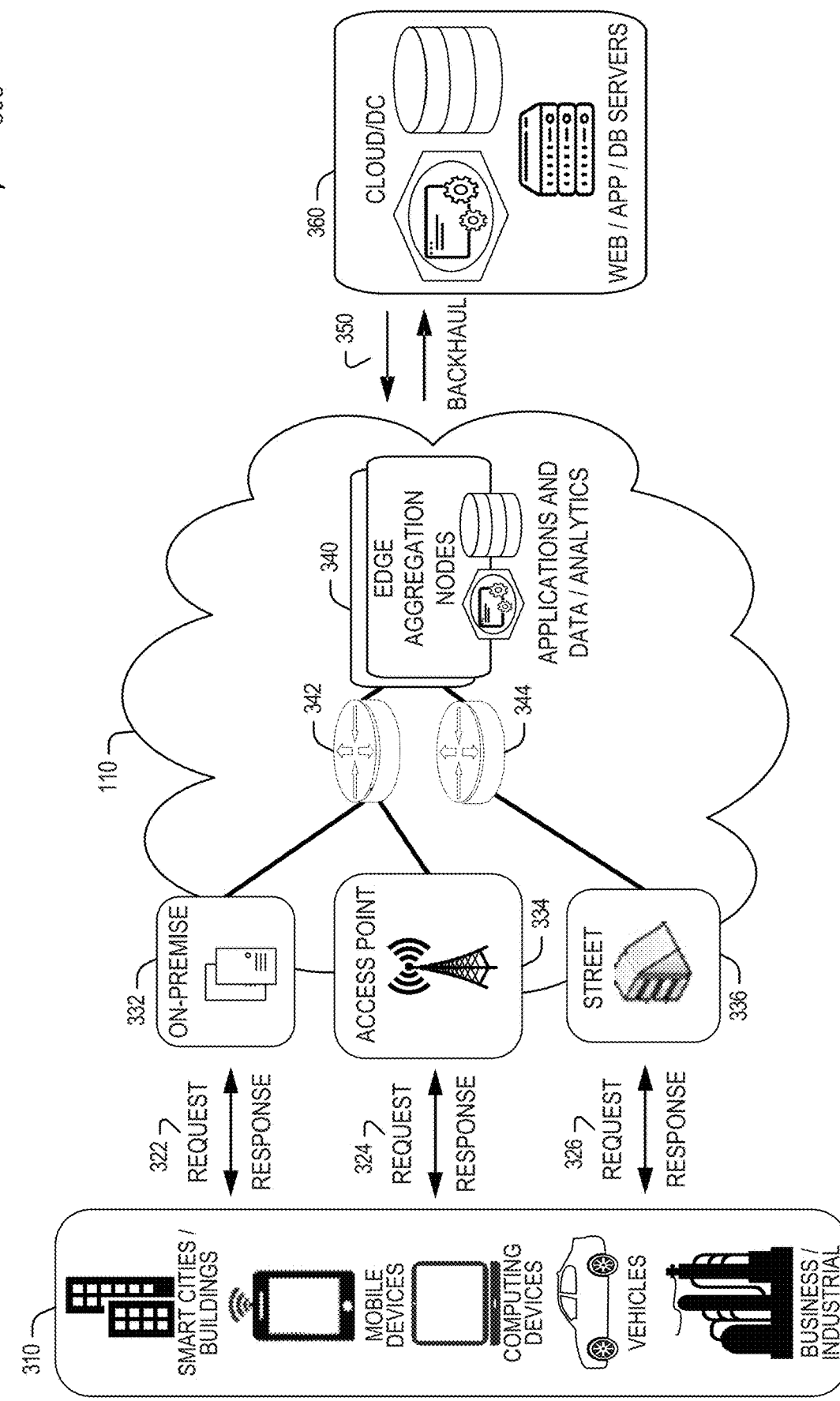
FIG. 3 illustrates a block diagram of an example environment for networking and services in an edge computing system.

FIG. 3 illustrates a block diagram of an example environment 300 in which various client endpoints 310 (in the form of mobile devices, computers, autonomous vehicles, business computing equipment, industrial processing equipment) exchange requests and responses with the example edge cloud 110. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
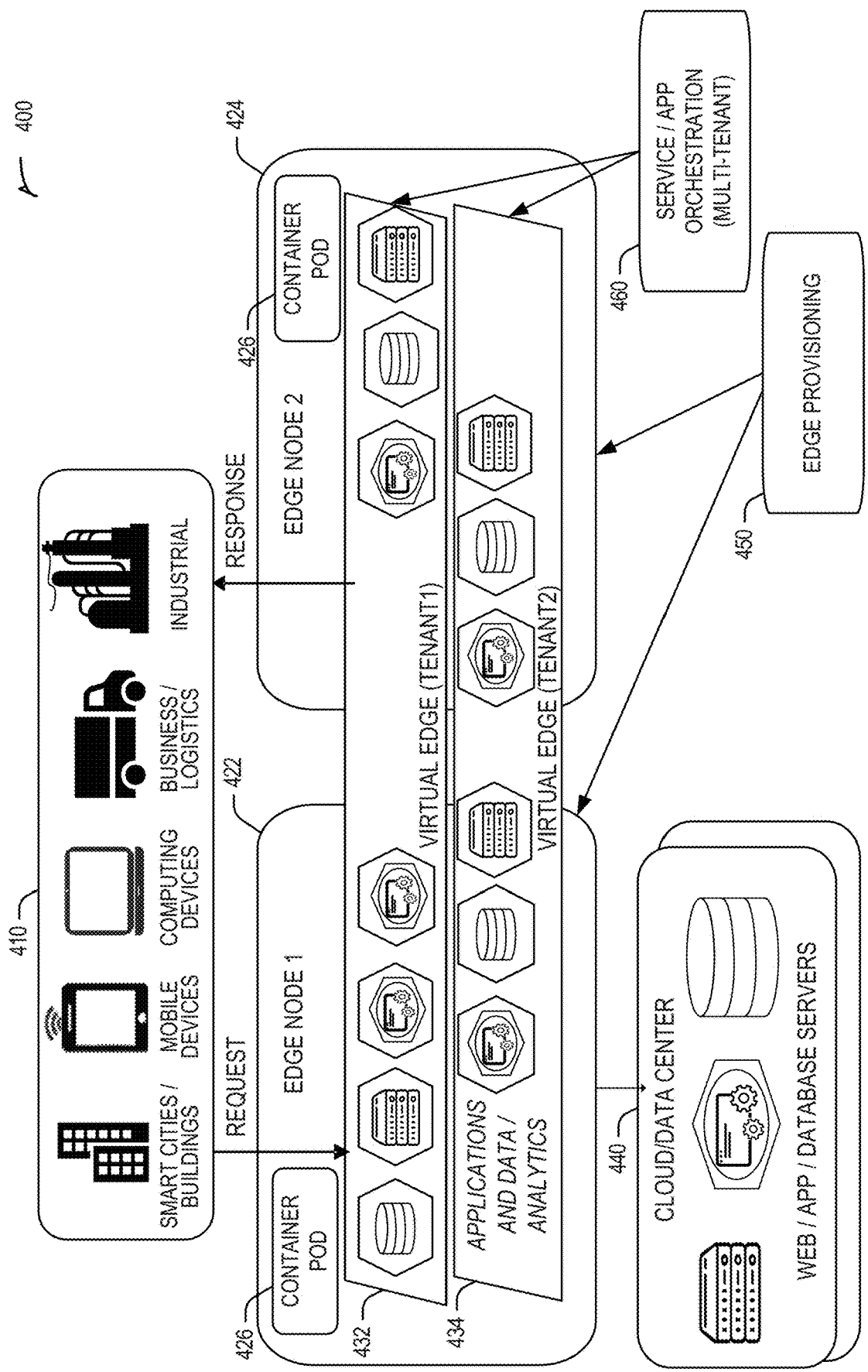
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices 410 are multi-tenant devices where Tenant 1 may function within a tenant1 'slice' while a Tenant 2 may function within a tenant2 'slice' (and, in further examples, additional or sub-tenants may exist; and each tenant may even be specifically entitled and transactionally tied to a specific set of features all the way down to specific hardware features). A trusted multi-tenant device may further contain a tenant-specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective devices 410, 422, and 440 spanning RoTs may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or respective computing systems and resources which are co-owned or co-managed by multiple owners).

For instance, each of the edge nodes 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., the orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA.

The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute, and a different shared pod controller is installed and invoked prior to the second pod executing.

Figure 5:
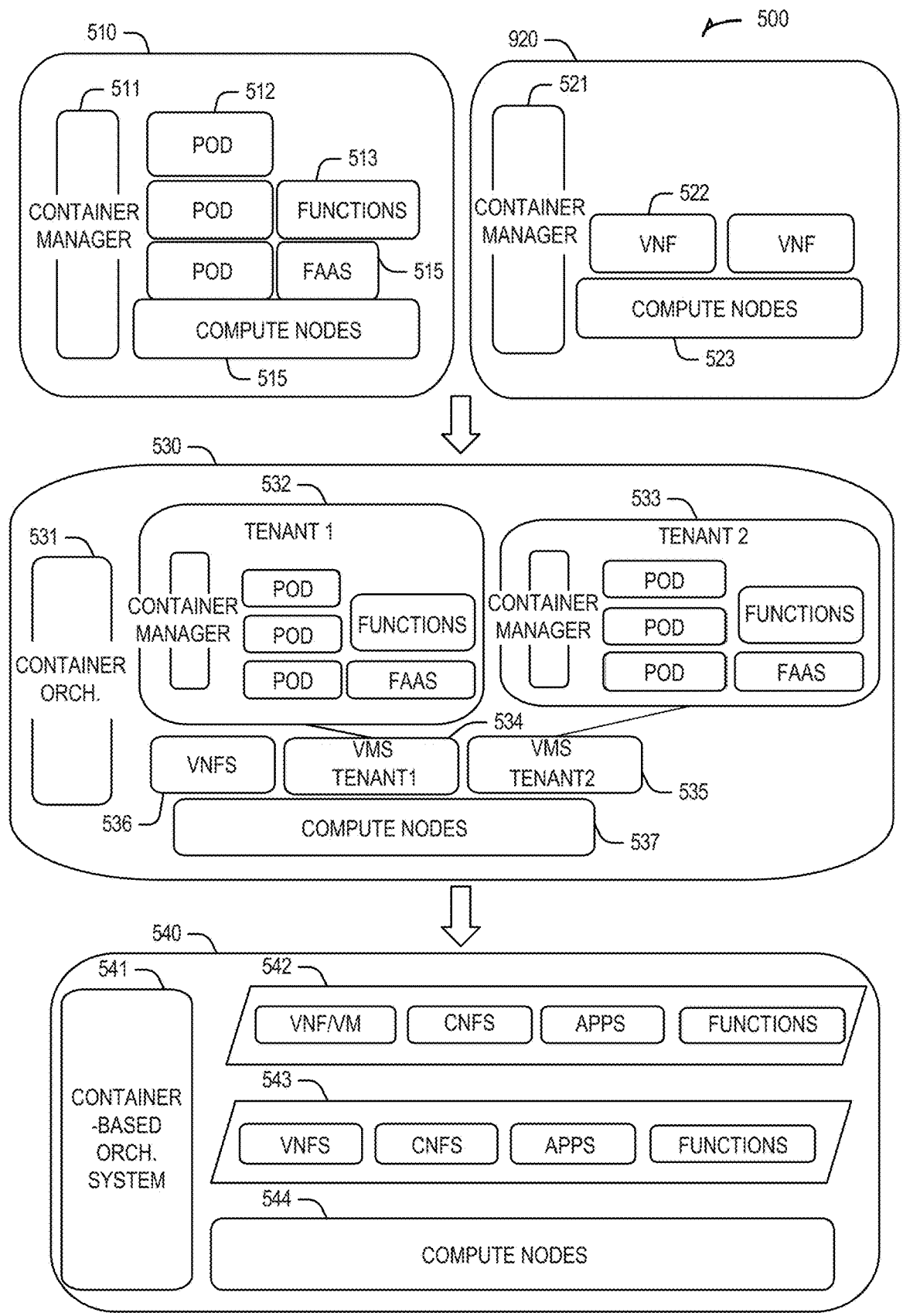
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and a container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in an example system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements depicted in FIG. 5 provide an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves, and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services of an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
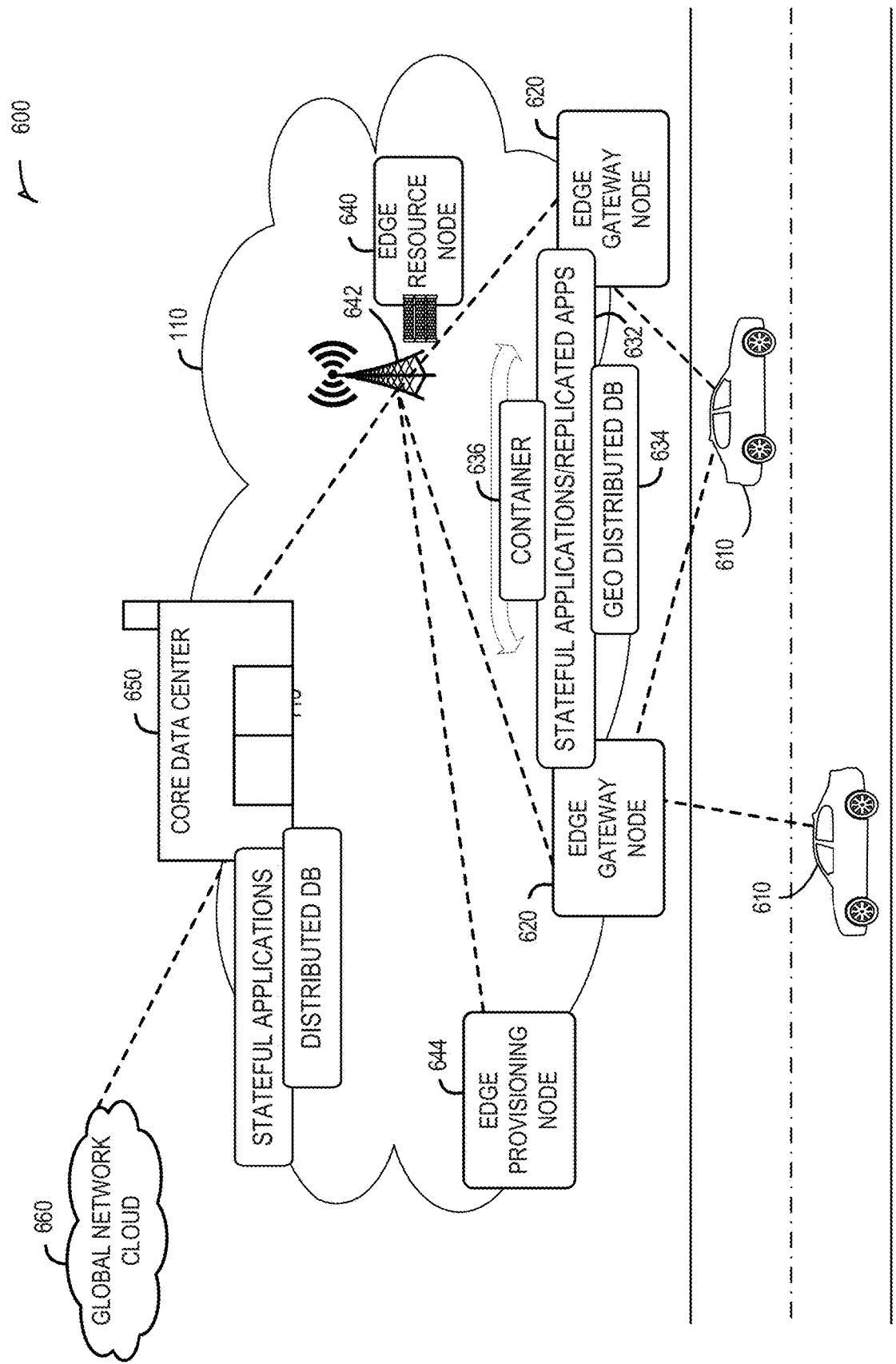
FIG. 6 illustrates an example compute and communication use case involving mobile access to applications in an example edge computing system.

It should be appreciated that the edge computing systems and arrangements discussed herein may be applicable in various solutions, services, and/or use cases involving mobility. As an example, FIG. 6 shows an example simplified vehicle compute and communication use case involving mobile access to applications in an example edge computing system 600 that implements an edge cloud such as the edge cloud 110 of FIG. 1. In this use case, respective client compute nodes 610 may be embodied as in-vehicle compute systems (e.g., in-vehicle navigation and/or infotainment systems) located in corresponding vehicles which communicate with example edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular one of the edge gateway nodes 620 may propagate so as to maintain a consistent connection and context for the example client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway nodes 620.

The edge gateway nodes 620 may communicate with one or more edge resource nodes 640, which are illustratively embodied as compute servers, appliances or components located at or in a communication base station 642 (e.g., a based station of a cellular network). As discussed above, the respective edge resource node(s) 640 include an amount of processing and storage capabilities and, as such, some processing and/or storage of data for the client compute nodes 610 may be performed on the edge resource node(s) 640. For example, the processing of data that is less urgent or important may be performed by the edge resource node(s) 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The example core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource node(s) 640 may offer the use of stateful applications 632 and a geographically distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource node(s) 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from one of the edge nodes 620 to other edge nodes (e.g., another one of edge nodes 620, one of the edge resource node(s) 640, etc.) such that the container with an application and workload does not need to be reconstituted, re-compiled, re-interpreted in order for migration to work. However, in such settings, there may be some remedial or "swizzling" translation operations applied. For example, the physical hardware at the edge resource node(s) 640 may differ from the hardware at the edge gateway nodes 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node(s) 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 1882 of FIG. 18B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 1882 of FIG. 18B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 1882 of FIG. 18B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 1882 from the edge provisioning node 644. For example, the software instructions, which may correspond to the example computer readable instructions 1882 of FIG. 18B, may be downloaded to the example processor platform/s, which is to execute the computer readable instructions 1882 to implement the methods described herein.

In some examples, the processor platform(s) that execute the computer readable instructions 1882 can be physically located in different geographic locations, legal jurisdictions, etc. In some examples, one or more servers of the edge provisioning node 644 periodically offer, transmit, and/or force updates to the software instructions (e.g., the example computer readable instructions 1882 of FIG. 18B) to ensure improvements, patches, updates, etc. are distributed and applied to the software instructions implemented at the end user devices. In some examples, different components of the computer readable instructions 1882 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 18A and 18B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7:
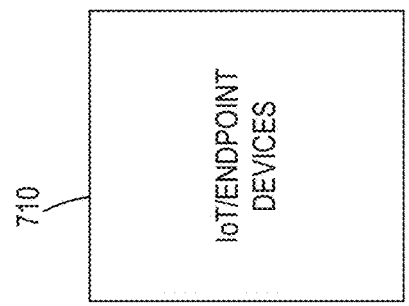
FIG. 7 is a block diagram of an example three-tier network having an Internet of Things platform, an edge cloud, and a core cloud.
Figure 7:
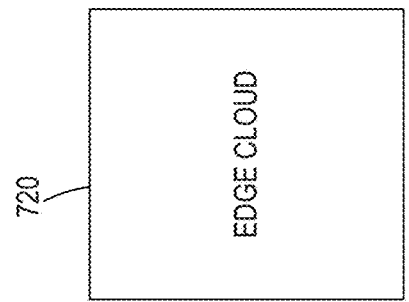
Figure 7:
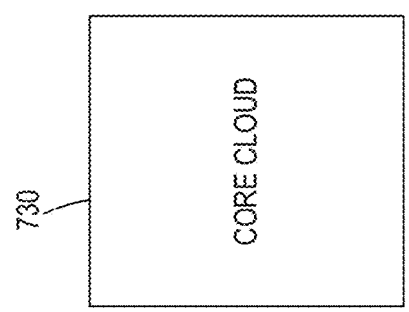

FIG. 7 is a block diagram of an example three-tier network 700 including a first tier 710 of an Internet of Things (IoT)/and endpoint devices, a second tier 720 having edge devices that form an edge cloud 720, and a third tier including core cloud devices that form a core cloud 730 (e.g., the global network cloud 620 of FIG. 6). In some examples, the core cloud 730 can be implemented using the core network data center 235 (FIG. 2) and the cloud data center 245 (FIG. 2). Core cloud devices of the third tier 730 are at a distant end (of the three tier network 700) from the endpoint devices of the first tier 710. The edge devices are typically positioned between the core cloud 730 and the endpoint devices and further enable communication between the core cloud devices and the endpoint devices of the first tier 710. Typically, edge devices reside closer to the endpoint devices than the core cloud devices such that the edge devices are described as residing at an "edge" of the core cloud 730 as described above.

Figure 8:
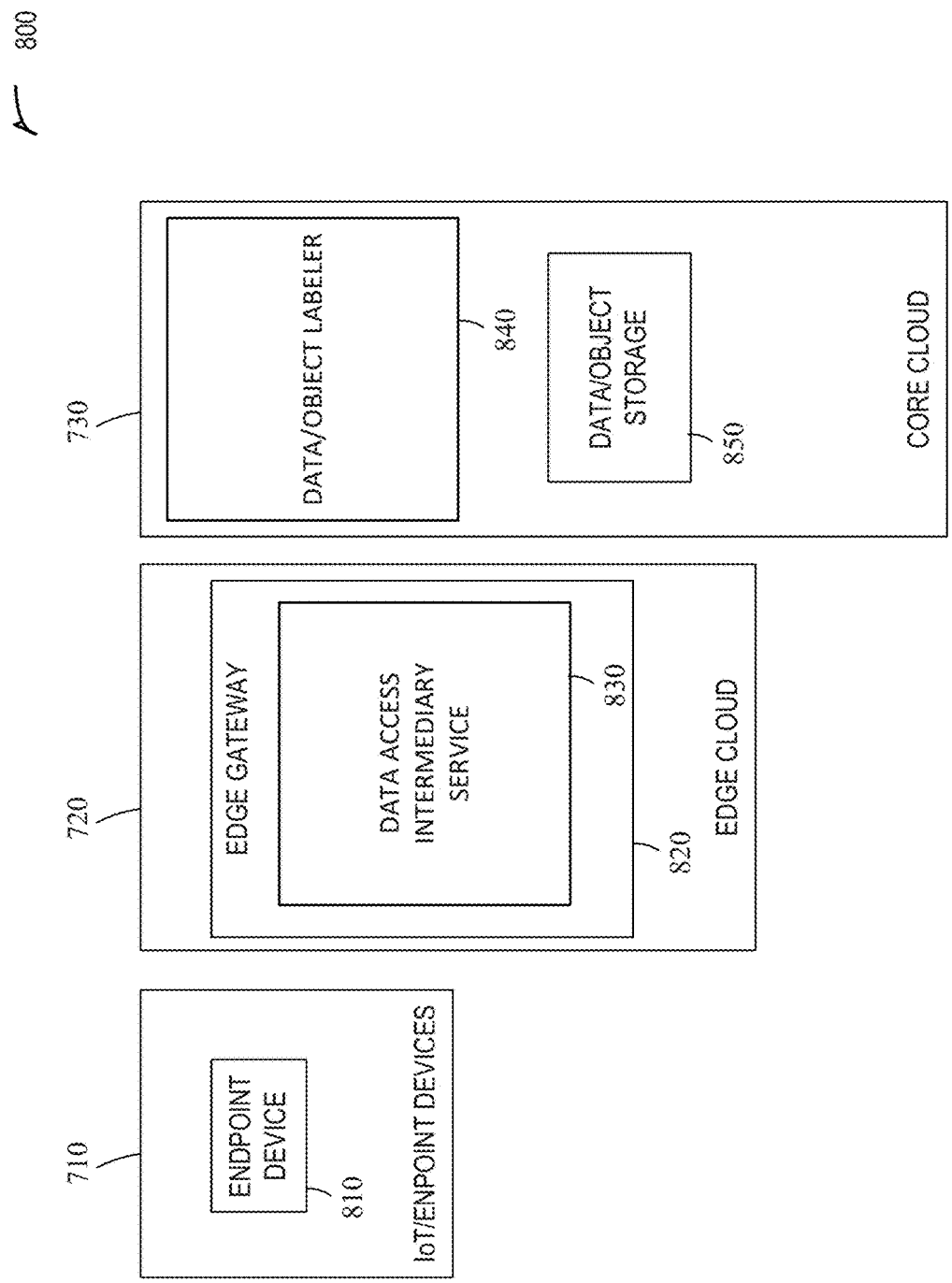
FIG. 8 is a block diagram of the three-tier network of FIG. 7 in which the edge cloud includes an edge gateway having a data access intermediary service and in which the core cloud includes a data storage and a first data/object labeler.

FIG. 8 is a block diagram 800 of the example three-tier network 700 of FIG. 7 in which example devices residing in the various tiers are shown including an example endpoint device 810 in the first tier 710 of the network, an example edge gateway 820 having an example data access intermediary service 830 in the second tier 720 of the network 700 and an example first data/object labeler 840 (also referred to herein as a data labeler and/or an object labeler) and an example data/object storage 850 in the core cloud 730 of the three tier network 700. In some examples, the data object/storage 850, and/or the first data/object labeler 840 are distributed among core cloud 730 and edge cloud 720 tiers. In some examples, a user operating the example endpoint device 810 requests access to data stored in the data/object storage 850 of the core cloud 730 (or data located/stored anywhere in the three-tier network 700). The data access request is received at the data access intermediary service 830 of the edge gateway 820. The data access intermediary service 830 uses information about the identity of the user/endpoint device 810 requesting access to the data (also referred to herein as the accessing-entity), information about a context in which the data access is being requested, and information about a boundary label associated with the data to which access is being requested. The boundary label defines a boundary having restrictions based on policies, rules, etc., that govern whether the data can be accessed, by whom it can be accessed, from which locations it can be accessed, etc. In some examples, the boundary can be associated with a user (and/or associated electronic user devices), a law, a geographical location, a company policy, governmental treaties, privacy laws, etc. In some examples, boundaries are referred to herein as sensitive boundaries such that data is not permitted to cross the sensitive boundary. Sensitive boundaries can indicate that a data crossing may violate a geographical boundary, a legal boundary, a privacy law, etc.

Figure 9:
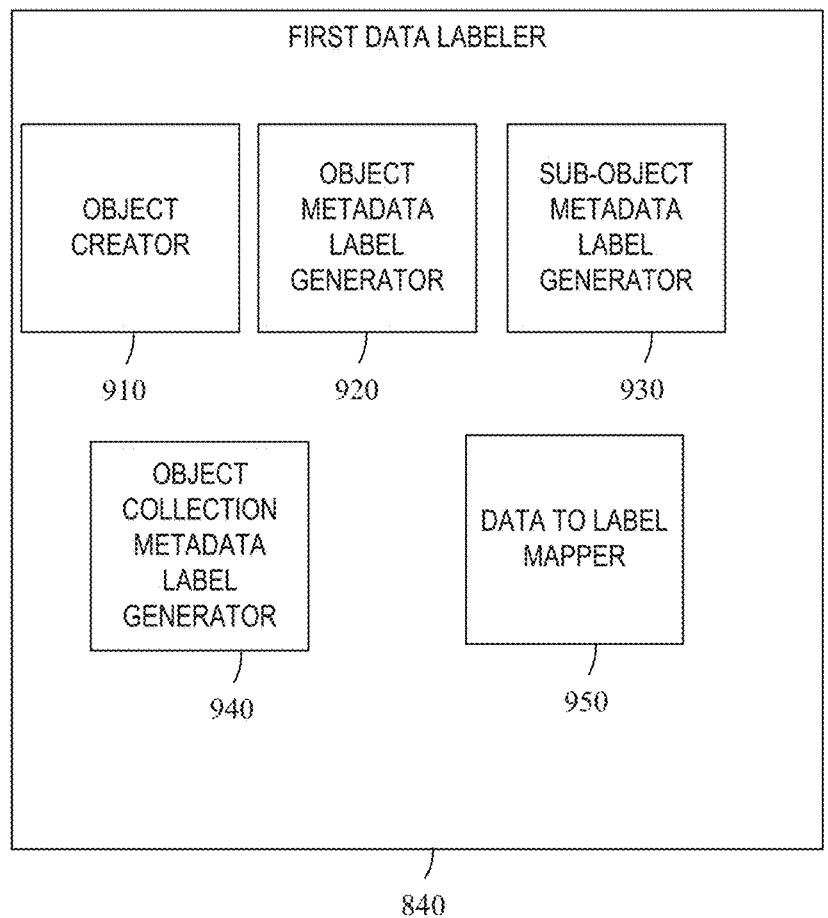
FIG. 9 is a block diagram of the first data/object labeler of FIG. 8.

FIG. 9 is a block diagram of the example first object/data labeler 840 also shown in FIG. 8. In some examples, the first data/object labeler 840 includes an example object creator 910, an example object metadata label generator 920, an example sub-object metadata label generator 930, an example object collection metadata label generator 940, and an example data to label mapper 950. In some examples, the data to label mapper 950 can be implemented as a key value store, a set representer, a hash table, an index, a trie, etc. In some examples, the object creator 910 forms a first object Object1. In some examples, data members (e.g., data members A-F of FIG. 10) that form the first object, Object1, are of a same type of data. Further, other objects formed by the objected creator 910 that have the same type of data as the first object, Object1, may have a similar internal structure as the first object, Object1. Thus, the first data/object labeler 840 is an example of means for labeling an object, a sub-object, and/or a collection of objects. Similarly, the object creator 910 is an example means of creating an object or an object collection.

Figure 10:
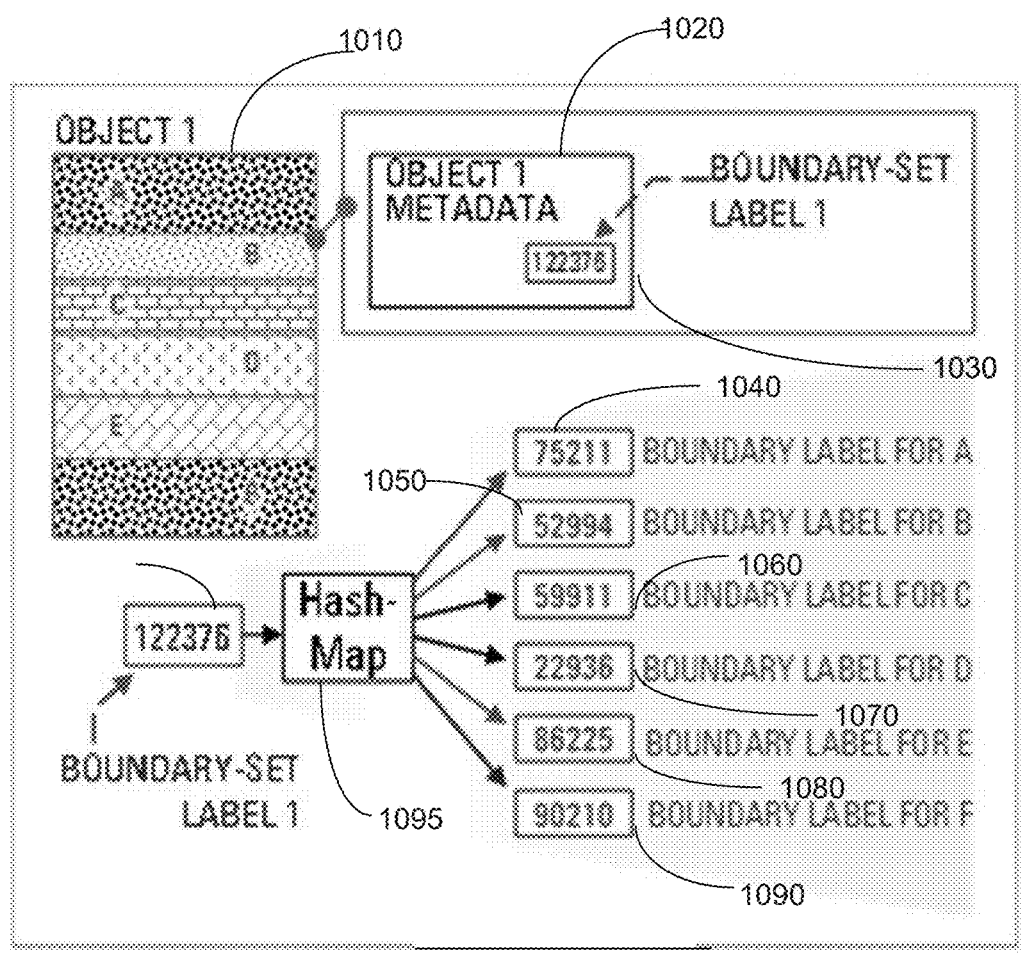
FIG. 10 illustrates an object having multiple data members and corresponding boundary labels.

It is noted that although the data members A-F of FIG. 10 have a similar internal structure the data members A-F do not represent the same data. Thus, if, for example, the first object, Object1, a second object, Object2, and a third object, Object3 are identically structured (e.g., the three objects are all a same data type such as image type, video type, audio type, etc.), the three objects do not, in general, have the same boundary labels. In some such examples, an object navigation code does not have to have different ways of parsing the three objects but can instead use the same parser and the same object creator 910 can be used to create the three objects (e.g., Object1, Object2, Object3). Thus, a common data labeling method can be used for the internal fields of the different objects without creating an explosion of data labeling methods. As a result of this feature, the technology disclosed herein is scalable.

As stated above, to say that objects have a same internal structure is not to say that the objects have identical data stored therein. Additionally, it is noted that data having a similar internal structure can be persistent/persisted while also preserving the internal data structures that define data boundaries. A persisted object that is then read from storage media already has label boundary metadata such that the label boundary metadata need not be re-generated upon a read of the data. In some examples, however, the object metadata label generator 920 might still provide a check function to ensure the storage subsystem did not corrupt the labels or data boundaries. Such a check function could include building an integrity check value such as a Hamming code, cryptographic message digest, hash table or other integrity check/checksum to be created upon data write to storage and re-verified upon data read.

In some examples, the example sub-object metadata label generator 930 generates unique metadata labels that are each associated with unique ones of the data members (also referred to as sub-objects) and the object metadata label generator 920 generates a unique boundary metadata label for the object. The example object collection metadata label generator 940 generates an object collection metadata label to be associated with a collection of objects. The data to label mapper 950 is used to associated each of the metadata labels with the corresponding one of the sub-objects, object, and collections of objects. In some examples, the sub-objects included in an object can be accessed using the object metadata and the sub-object meta data label. Similarly, the data to label mapper 950 is used to associate the object collection metadata label with each collection in the object collection. In some examples, the object metadata label defines (for the object) a data boundary that the data included in the object cannot pass without applying one or more policies, rules, etc. In the same way, each of the sub-object metadata labels define corresponding boundaries that the sub-object data cannot pass without applying one or more policies, rules, etc. Likewise, the object collection metadata label defines a corresponding boundary that the collections included in the object collection cannot pass without applying one or more policies, rules, etc. (e.g., satisfying one or more conditions). In some examples, the corresponding ones of the policies, rules, etc., once applied, dictate whether the corresponding object, the corresponding sub-objects, and/or the corresponding objects of the object collections can pass the corresponding boundaries. Thus, the label generators 920, 930, 940 are example means for generating sub-object boundary labels, object boundary labels and object collection boundary labels. Similarly, the data-to-label mapper 950 is an example means for mapping/associating data/object/object collections with boundary labels.

FIG. 10 further illustrates the results of the operations performed by the example data labeler of FIG. 8 and FIG. 9. FIG. 10 includes an example first object 1010 (referred to as Object1) having six sub-objects (e.g., data members) (referred to herein as data member A, data member B, data member C, data member D, data member E, and data member F. Although the Object1 1010 in the example of FIG. 10 includes 6 data members (A-F), Object1 1010 could instead include greater than or fewer than six members. In the example of FIG. 10, Object1 1010 is associated with first metadata 1020 (referred to as the Object1 metadata 1020). In the example of FIG. 10, the Object1 metadata is associated with a boundary-set label 1 1030. In the example of FIG. 10, for example purposes only, the boundary-set label 1030 for Object1 1020 is illustrated as being "122376" but could instead be any other label having any number of numerals, etc. Thus, policies/rules/etc. defined by (or otherwise associated with Object1 1010) are to be applied before access to the data of Object1 1010 can be accessed. In the example of FIG. 10, each of the sub-objects of Object 1 1010 (e.g., the data members of Object1) is associated with a corresponding boundary label that defines a corresponding set of policies/rules/etc. (e.g., conditions to be met) to be applied to each of the individual ones of the corresponding data members (sub-objects) before the individual ones off the data members data members can cross the boundary. In the example of FIG. 10, the boundary label for data member A is "75211" 1040, the boundary label for data member B is "52994" 1050, boundary label for data member C is "59911" 1060, the boundary label for data member D is "22936" 1070, the boundary label for data member E is "86225" 1080, and the boundary label for data member F is "90210" 1090. As illustrated in FIG. 10, an example hash map 1095 (also referred to as the data-to-label mapper 950 (FIG. 9)) is used to associate the boundary-set label 1 1030 (the boundary defined for Object1) with each of the boundary labels 1040, 1050, 1060, 1070, 1080, 1090, corresponding, to the data members A-F, respectively.

Figure 11:
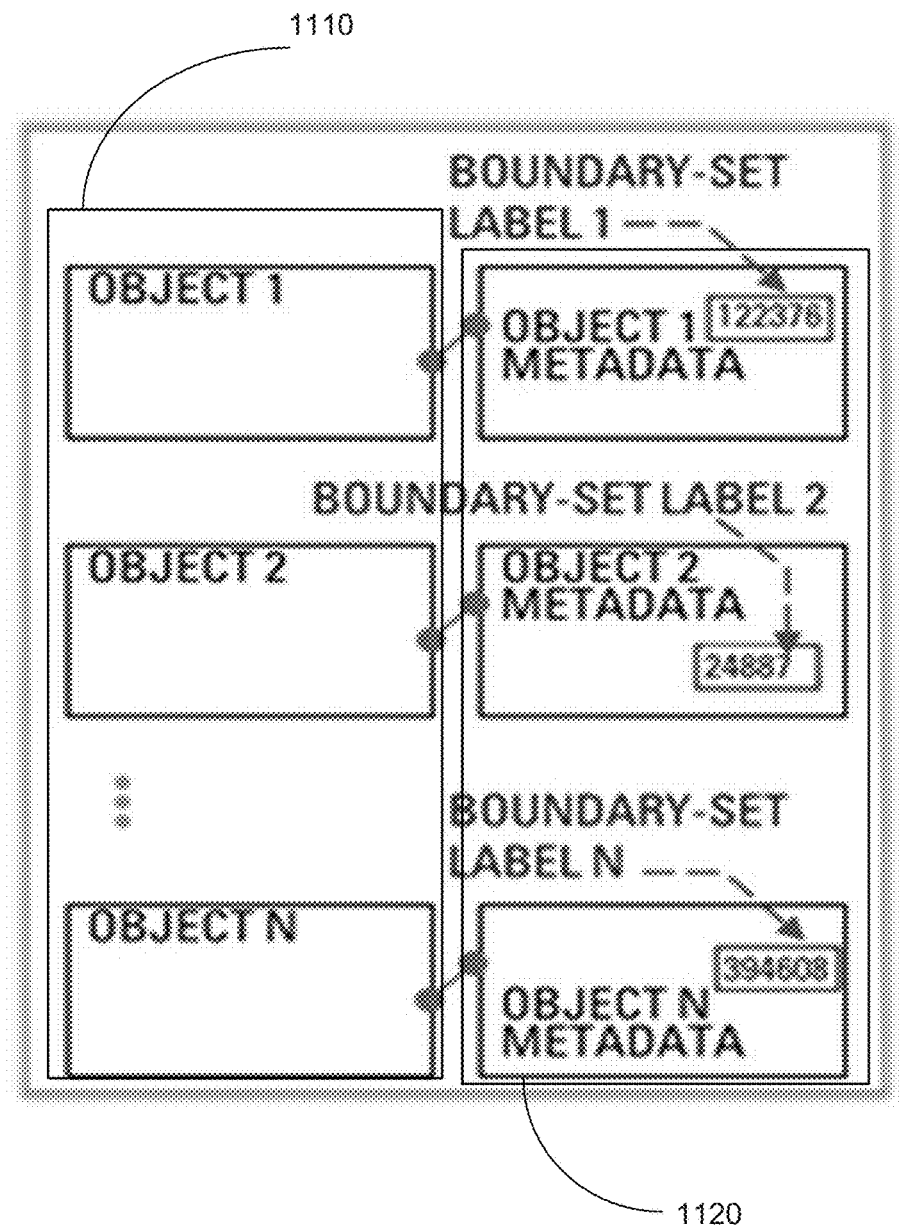
FIG. 11 illustrates an example set (N) of objects and a boundary-set label corresponding to each such object.

FIG. 11 illustrates an example set of N Objects (e.g., Object1, Object2, . . . Object N) 1110 and an example set of corresponding boundary-set labels (e.g., Boundary-Set Label 1, Boundary-Set Label 2, . . . Boundary-Set Label N) 1120. As described above with respect to FIG. 10, each of the boundary-set labels 1120 define a set of policies/rules/etc. to be applied to data included in the corresponding one of the Objects 1110 before the data of the corresponding ones of the objects 1110 can be accessed.

Figure 12:
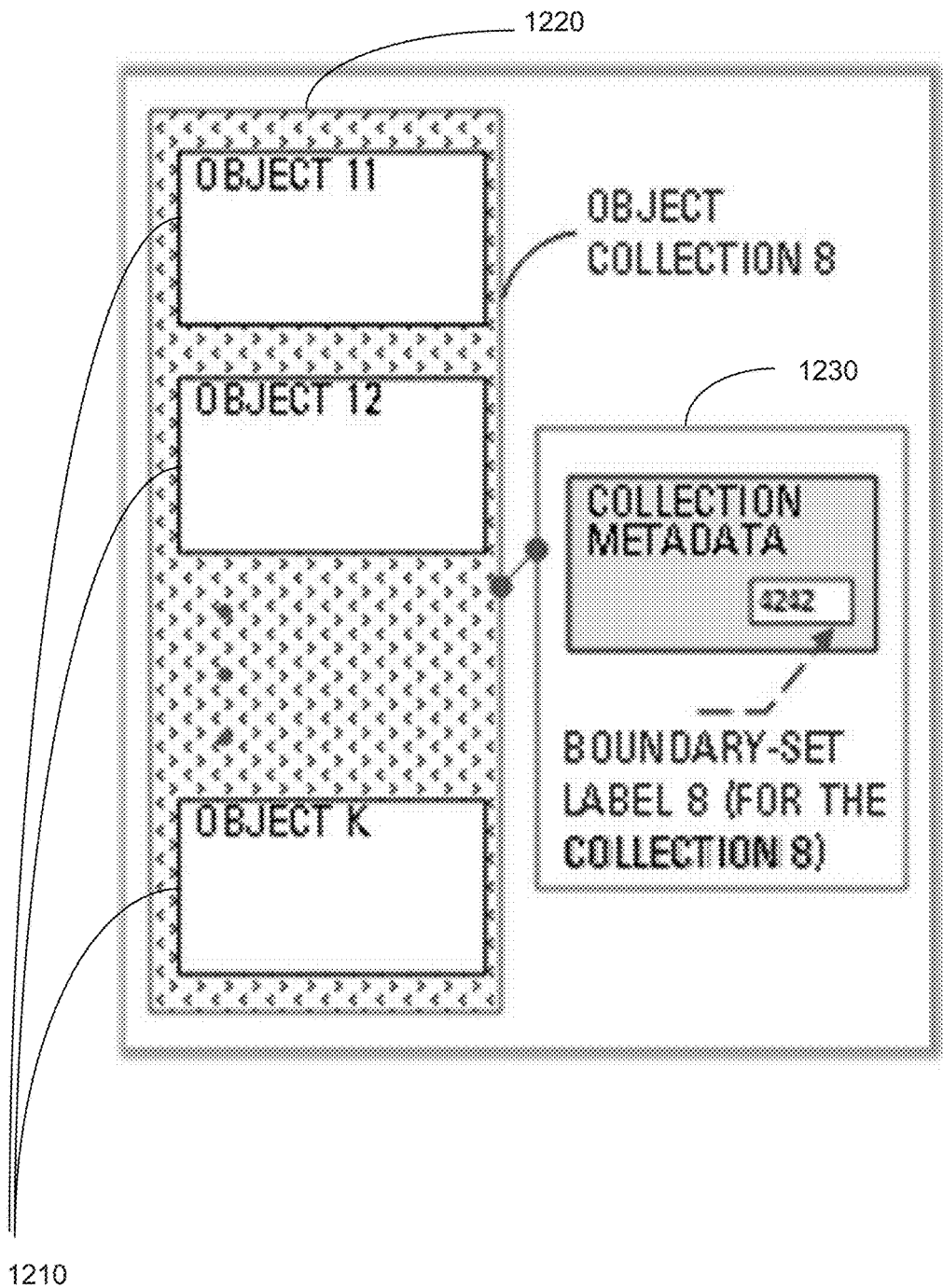
FIG. 12 illustrates an example object collection having multiple (K) objects identified by a boundary-set label.

FIG. 12 illustrates an example collection of K Objects 1210 titled (Objection Collection 8) 1220 that includes the a set of K objects (e.g., example Object 11, example Object 12, . . . example Object K) 1210. In the illustrated example of FIG. 12, the K objects 1210 form the Object Collection 8 1220 which has a corresponding boundary-set label 1230 that defines one or more policies/rule/etc. to be applied to the Object Collection 8 1220 before the data objects 1210 contained therein can be accessed. Thus, an object, sub-object and collections of objects are example ways in which data can treated individually and/or collectively (in objects and object collections) for access (or not) depending on the outcome of applying policies/rules/etc. at the various individual and collective levels. (e.g., data members/Objects/Object Collections). Thus, a data member of Object 11 included in Collection 8 1220 can be accessed across a boundary when the policies/rules/etc. defined by the boundaries associated with each level (data member, object, collections of objects) have been applied.

The metadata corresponding to the data members (sub-objects), objects, and collections of objects, respectively, travels with the data members (sub-objects), objects, and collections of objects as the data members (sub-objects), objects, and collections of objects traverse various devices of a data transmission route. In some examples, the ability to access the data members (sub-objects), objects, and collections of objects across a boundary can be determined using the example data access intermediary service 830 of FIG. 8. As such, the data access intermediary service 830 of FIG. 8 is responsible for ensuring that data is not permitted to cross a boundary without permission (which can include meeting one or more conditions) and to ensure that the link between metadata and the corresponding data is not severed. To undertake these responsibilities, the data access intermediary service 830 determines whether a boundary label corresponding to the boundary being crossed correctly and verifiably corresponds to the corresponding one of the data members (sub-objects), objects, and collections of objects for which the boundary crossing is being checked. In some such examples, the data members (sub-objects), objects, and collections of objects and the corresponding ones of the boundary labels are unforgeably and immutably associated with each other. In some examples, associating the data members (sub-objects), objects, and collections of objects to the corresponding one of the boundary labels can occur at the example first data object labeler 840 of FIG. 8. In some examples, associating the data members (sub-objects), objects, and collections of objects to corresponding ones of the boundary labels can occur at a second data/object labeler 1377 (FIG. 13) of the data access intermediary service 830 of FIG. 13. In some such examples, the second data/object labeler 1377 may be used to generate and associate labels with data members (sub-objects), objects, and collections of objects when such data/objects and collections of objects are newly created, as described further below. The second data/object labeler 1377 includes all of the components of the first data/object labeler 840.

In some examples, the unique boundary label corresponding to data members (sub-objects), objects, and collections of objects can be cryptographically verifiable in reference to a measurement taken over the data (e.g., using a Galois checksum that can only be correct if the rest of the label and a public certificate to which it refers fall out from a public key decryption of a specified portion of the label). Alternatively, the label may be immutably associated with the data by a public or private blockchain, or verifiable through the services of a secure distributed key value store.

In some examples, the data access intermediary service 830 can include a hardware accelerator implemented using smart network interface cards (NICs) that have hardware level attestation so that the NIC can be delegated the responsibility of: (a) verifying/authenticating a data object and its corresponding label (e.g., ensuring that the data corresponds to the boundary label and vice versa, (b) (based on applying the appropriate policies/rules/etc., that define a boundary) ensuring that a packet of data is not moved where it is not permitted to go, and (c) ensuring that the link between metadata and corresponding data is not severed. In some examples, to avoid corruptibility so that the desired boundary enforcements occur, the data access intermediary service 830 is either a properly attested and certified logic in software that executes in a trusted domain or container or is implement in secure or properly verified hardware (e.g., a smart NIC).

In addition to using data members (sub-objects), objects, and collections of objects and corresponding boundary labels that are immutably associated with the other, in some examples, labels are shared by different objects (e.g., a boundary label is not unique to one object). As a result, the same label can potentially be associated with many objects. In some such examples, the label is not to be used to verify the corresponding data, rather, the label is tied to a name or identifier of the data (not the data value). Though the usage of non-unique labels can be more complex, non-unique labeling of objects is more scalable as the label does not have to be used to verify a data value but is rather securely tied to the name or identifier of the data.

In such examples, a label can be immutably associated with an object in a secure key value store or through a public or private blockchain. In some such examples, a storage system that supplies the data value and the label value ensure that the data and label values have not been modified by untrusted parties, and the data access intermediary service 830 performs the task of verifying that the data's name maps to the right label, that the name-to-label linkage is unforgeable, and to place that name to label linkage in a distributed key value store or in a blockchain. In all such examples described above, an accelerator (or smart NIC) can make it unnecessary for a central processing unit to have to perform the verification, signing, logging, or insert/lookup/delete operations on a key value store or a block chain. Thus, in some examples, for the foregoing reasons, the data access intermediary service 830 includes a smart NIC to perform the data/data label verification described above.

In some examples, the processing/validating of object, object-meta-data, object-boundary-set-label(s) occurs in a trusted execution environment (TEE) or trusted computing base (TCB) such that the association of metadata to data is protected, and the association of boundary labels to data/metadata is protected. It is noted that protection, in this context, can be provided by the usage of firmware that authenticates, any reads/writes/updates of/to the various data elements by a root-of-trust process (e.g., DICE (Device Identity Composition Engine), a security processor (e.g. Intel CSME) or a BMC, etc. In some such examples, only trusted firmware is provisioned to the TCB/TEE processor.

Figure 13:
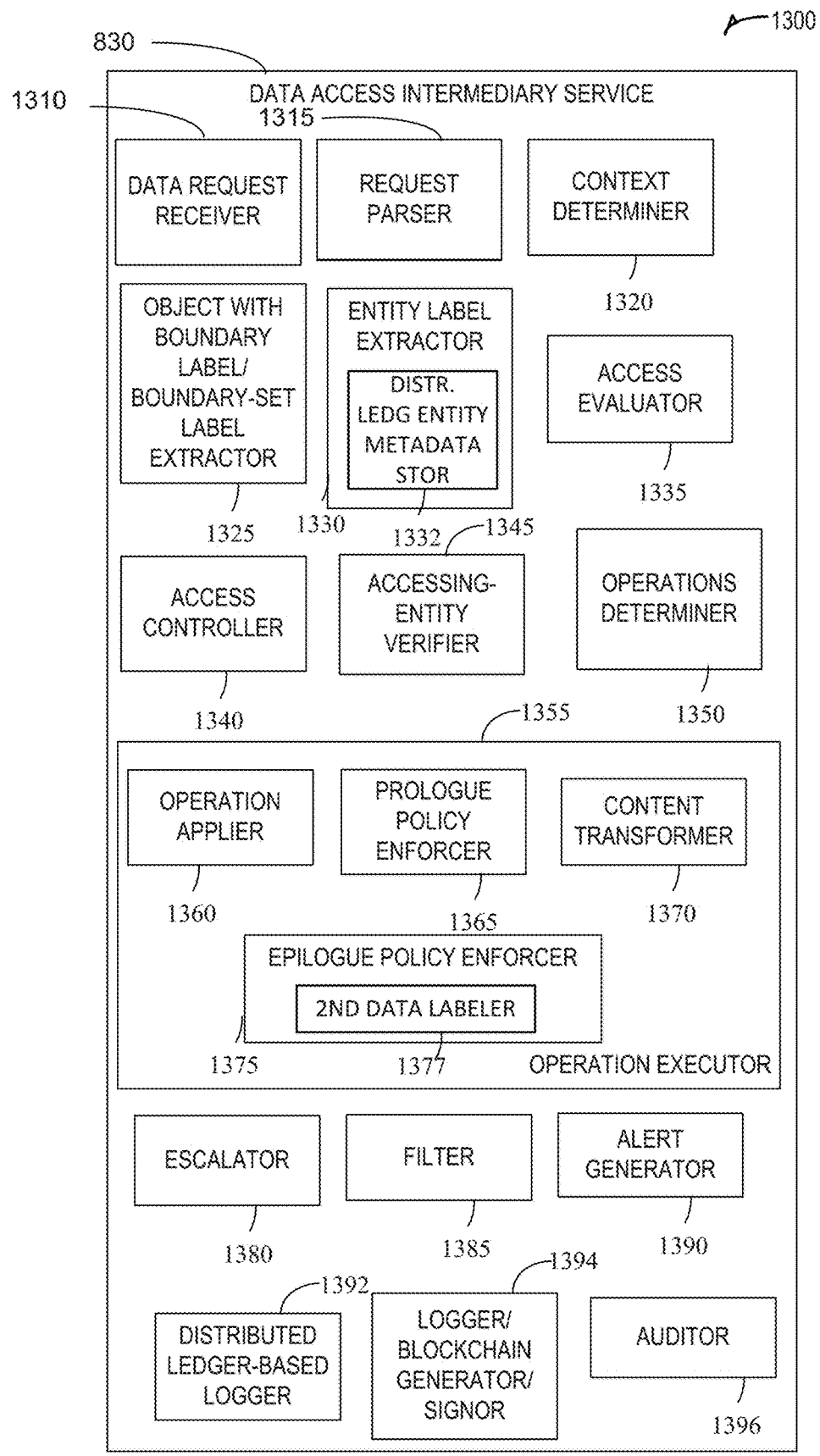
FIG. 13 is a block diagram of the data access intermediary service of FIG. 8.

FIG. 13 is a block diagram of the example data access intermediary service 830 of FIG. 8. In some examples, the data access intermediary service 830 includes an example data request receiver 1310, an example request parser 1315, an example context determiner 1320, an example entity label extractor 1330, an example distributed ledger entity metadata storage 1332, an example object with boundary label/boundary set label extractor 1325, an example access controller 1340, an example access evaluator 1335, an example operations determiner 1350, an example operations applier 1360, an example prologue policy enforcer 1365, an example content transformer 1370, an example epilogue policy enforcer 1375, an example second data labeler 1377, an example escalator 1380, an example filter 1385, an example alert generator 1390, an example distributed ledger logger 1392, an example logger/blockchain generator/signor 1394, and an example auditor 1396. In some examples, the logger/blockchain generator/signor 1394 is implemented using a smart NIC.

In operation, a request for data is received at the data request receiver 1310. In some examples, data (e.g., an object) for which access has been requested is also (or instead) received at the data request receiver 1310 of the data access intermediary service 830. In some examples, the data being requested can be a data member included in an object that is included in a collection of objects. In some examples, the data can be the data members of an entire object, and in some examples, the data requested can be data members of an object that is further included in a collection of objects. Thus, requests for access can include a request to access data (collectively or individually) located at any level including the data member (sub-object) level, the object level, the object collection level and any possible variation thereof. In some examples, the boundary-set labels describe collections that are horizontally disposed in a data structure and, in some examples, the boundary-set labels that describe collections that are vertically disposed in a data structure. In some examples, a boundary-set label associated with a collection can have a transitive property such that access to (or restriction from) data members at the collection level also reinterprets a default attribute for the corresponding access at the next level. In some examples, the boundary-set label associated with a collection can be non-transitive. Thus, the boundary labels and boundary-set labels operate much in the same way as do access-control attributes in a file system.

However, a difference between a conventional access control file system and the data access intermediary service 830 disclosed herein is that different parts (e.g., data members) of an object may be differently available to different (separate) requesting parties even as some parts of an object are uniformly available. Thus, the entity accessing the data is also taken into consideration when making a determination as to whether a data access is to be permitted (or not). To accommodate entity-describing data, an accessing entity's descriptor forms yet another label (referred to as an entity label). The entity label can be included with a request for data access made by the entity associated with the entity label. The entity labels can encode various aspects of identity, such as the name of a country, or an organization, or a jurisdiction, with which the accessing entity is associated, and that association may, itself, be a compound association having different aspects whose combination must be taken into account when evaluating whether or not access is permitted and/or conditions to be satisfied before, during, and after the access is performed.

Another difference between the systems, methods and apparatus disclosed herein) and a conventional access control file system) is that access-control in this invention is treated as a computable function in which the boundary labels and/or boundary-set labels are treated as parameters of the data access intermediary service 830 in addition to an accessing entity's descriptors (e.g., the entity label) and the context in which the accessing entity is seeking to perform the access. Within the data access intermediary service 830, the access-control decisions become functions that can call other functions (recursively, if needed) to arrive at highly nuanced evaluations which control the data access. In only one of many examples, an entity E can access data under a boundary label B with one set of restrictions in a first case, and with another set of restrictions in a second case (e.g., the entity E requesting a filtered view of the data in the second case).

Referring still to FIG. 13, the example data request receiver 1310 of the example data access intermediary service 830 can transmit the request for the requested data (object) to the example request/data parser 1315. The request/data parser 1315 can extract any metadata about the data (object) by utilizing information supplied by or associated with the data-to-label mapper 950 (FIG. 9). In some examples, the context determiner 1320 can determine a context in which the data is being requested (e.g., the type of access requested and why the access is being requested). In some examples, the context in which an access is performed can be determined implicitly based on entity information (e.g., the entity label and/or entity metadata M (described further below) included with the request. For example, the access being performed may arise as a spontaneous or exploratory action (e.g., a mobile phone initiating contact with a cell tower). In some examples, the context may not be implicit and, in some such examples, is supplied by an environment descriptor that is facilitating an operation during which the access arises.

Context can be implicitly determined, in one of many possible examples, when an employee E of one organization A, is attempting to access authorized data of another organization B using a smartphone on which an application has been installed prior to the data access attempt. In such an example, the application is supplied to the employee E's smartphone by the organization B. When the application is used to make a data request of the organization B, the application may implicitly provide context information (e.g., the employee E's role, the employee E's geolocation, the employee E's purpose, etc.). In some such examples, the context information may be supplied by the application based on code or logic that is built into the application to allow access to organization B through a specific portal and using a specific symmetric key that allows for speedy access to the data.

Context can be explicitly determined, in one of many possible examples, when employee E's smartphone is low on power or is otherwise unavailable. In such an example, the employee E may choose to use a browser on a laptop to make a request from the organization B for the information that the employee E wants to access. In this example, the employee E may be required (by the organization B) to supply authentication information which corresponds to an explicit context descriptor, C. The context descriptor C can include encoded information such as, for example, the identity of the employee E, the role of the employee E, the geolocation of the employee E, the reason the employee E is requesting the data, etc. Subsequently, the browser of the employee E's laptop can use any standard access method and protocol, such HTTP, TFTP, UPnP, etc., for the duration of the employee E's contact with the organization B. In such an example, the context descriptors are known to the organization B based on the authentication information provided by the employee E.

In some examples, the object boundary label and/or the boundary-set label extractor 1325 determines which of the metadata parsed by the request parser 1315 represents the object boundary label and/or the boundary-set label, etc. Next, the entity label extractor 1330 can extract the entity label from among the metadata separated by the parser 1315. In some examples, an entity E in a domain D is associated with metadata M which is to be used as the entity label. Thus, the entity label can describe and be dependent on aspects of the entity, a location/domain of the entity, as well as any other desirable attributes of the entity. In some examples, the entity label extractor 1330 can use the entity label to access the example distributed ledger entity metadata storage 1332 to determine the entity metadata associated with the entity label. In some examples, a hashing technique is used to identify the entity metadata.

In some examples, the example access evaluator 1335 can then use the context information C, the entity metadata M, and the object with the boundary label/boundary-set label to evaluate whether the data access being requested will produce a sensitive boundary crossing event. In some examples, the access evaluator 1335 uses a function to operate on the context C, the entity metadata M and the boundary B to determine whether a sensitive boundary crossing event will be produced. If a sensitive boundary crossing event will not occur via the data access, in some examples, access to the data is permitted by the access controller 1340. In some examples, when access to the data is permitted, the data access may be logged by the logger/blockchain generator/signor 1394, and the data access may be audited by the example auditor 1396. In some examples, auditing the data includes ensuring that the data is not severed from the corresponding boundary label before being accessed. In some such examples, the auditor can be implemented using a smart NIC.

If a sensitive boundary crossing event will occur, as determined by the access evaluator 1335, the access controller 1340 is notified. It is noted that in a percentage of the cases, a context, whether implicit or not, can effectively suppress or accelerate the access evaluation to determine whether the access is exceptional in some way (e.g., whether the data access is to be denied without further evaluation or whether the data access is to be fast-pathed).

When a sensitive boundary crossing event will occur, the example access controller 1340 notifies the example accessing-entity verifier which may use the entity information (e.g., the entity metadata M) to identify the accessing-entity and to determine whether the accessing-entity has permission to access the data. If access to the data by the accessing-entity is denied by the accessing-entity verifier 1345, the alert generator 1385 will generate an alert, if needed, the logger will log the attempt to access the data, if needed, and the escalator 1380 will escalate the attempt to access the data, if needed, to a system administrator or to another data access security system. Thereafter the failure of the data entry may also be logged in a distributed ledger by the example distributed ledger logger 1392. In some example distributed ledger logger is also implemented using a smart NIC.

As described above, when a sensitive boundary crossing event will occur (as determined by the access evaluator 1335), the example access controller 1340 notifies the example accessing-entity verifier 1345 which uses the entity metadata M to determine whether the accessing-entity has permission to access the data. When the access-entity is determined to be permitted access, the access controller 1340 notifies the example operations determiner 1350 which determines a set of operations to be performed so that any conditions associated with access of the data are met. In some examples, a number of operations are determined/identified and, in some such examples, are chained together such that the operations are performed in a sequential order.

In some examples, performing individual ones of the operations includes three parts. In a first part, the example policy enforcer prologue performs a policy setup. In the first part, the example content transformer 1370 also transforms the contents of the object as needed to meet the conditions associated with the policy. In some examples, the transforming of the object (and/or sub-objects and/or collections of objects) includes performing various filtering operations on boundary labels over data, as data gets derived by unions, intersections, and varieties of other transformations over predecessor data and its predecessor boundary labels. In some examples, policy mechanisms, auditing and triggering mechanisms can be called/performed when data is transformed.

In a second part, the operation applier 1360 applies the operations to the example transformed contents. In some examples, applying the various operations can include logging parts of the results of an operation, data-loss protecting parts of the results of an operation by inserting an indirection, etc. In some examples, the operations are referred to as lambda operations which include functions that can perform other functions and/or aggregate functions.

After the example operation applier 1360 has applied the operations, in a third part, the example epilogue policy enforcer 1375 performs any finalization steps that can include, in some examples, identifying newly created data objects and registering any boundary-labels associated with the newly generated content (data objects) that resulted from applying the operations to the data/object/collection to which access was granted. After the epilogue policy enforcer 1375 has operated, the example distributed ledge logger can log the success of the data access in a distributed ledger.

In some examples, for efficiency, the operations described in connection with the data access intermediary service 830 can be employed at any desired points (e.g., gateway nodes at the network edge) in the tiered network 700 (FIG. 7). Further, in some examples, such operations can be executed in an integral and secure manner so that derivative objects that are produced do not need to be protected following such filtering action that produced the newly generated object (e.g., derivative object), and which may be freely discarded after use.

Figure 14:
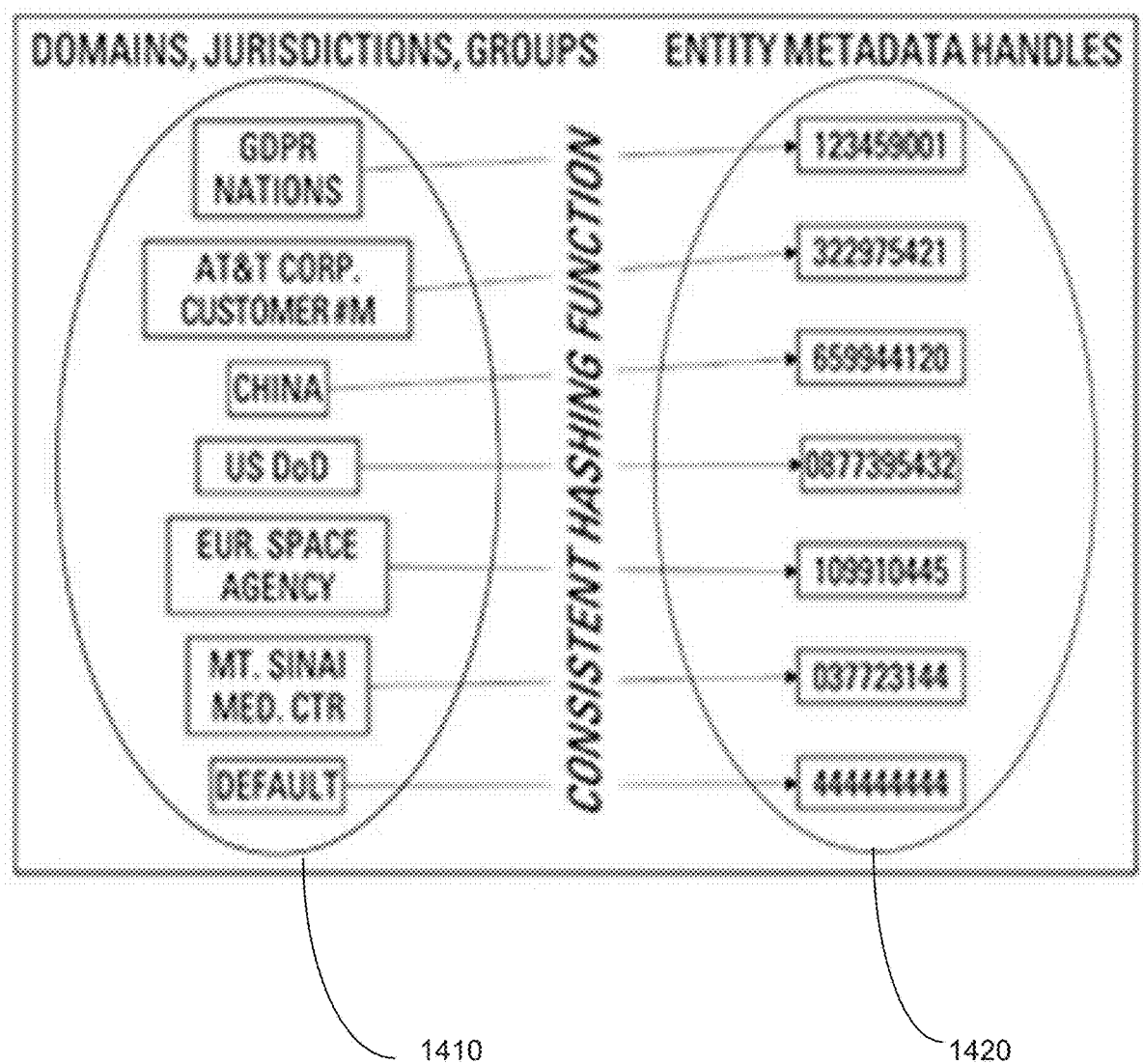
FIG. 14 illustrates a hashing of entity labels to generate entity metadata handles.

FIG. 14 illustrates a manner in which example entity information can be transformed into example entity metadata handles. In the illustrated example of FIG. 14, various example entity labels (e.g., descriptors or collections of descriptors) 1410 that represent possible data accessors are identified. The entities include domains, jurisdictions, groups, etc. In some examples, a consistent hashing function is used to transform each of the entity labels appearing on the side of FIG. 14 into "flat" entity metadata handles 1420. In some examples, a consistent hashing technique is used as it is resilient to failure in the machines (virtual or physical) and is well suited for distributed hashing tables.

In some examples, in default/null cases mapping from a default/null descriptor may result in a default entity handle (e.g., 0x00000000). In some such cases, (e.g., when handling null files or other files that do not contain actual data) the default handle may result in a bypass of the hashing operation. It is noted that in many instances, information is permitted to flow freely between a source of data and an entity accessing the data (e.g., searching for a news article that is in public domain, etc.). In such instances, the identity of the accessor is not important, so the entity label supplied with the data access request becomes superfluous. In some such instances, a null or default entity metadata handle can be used. The null or default entity metadata handle can be mapped trivially to an identity like NULL->John_Q_Public, so that there is no need to perform a mapping lookup through a consistent hashing function to find more information (entity metadata) as such entity metadata is superfluous in such circumstances. In some examples, the mapping shown in FIG. 14 can be performed using a fast and storage-efficient consistent hashing technique.

In some examples, a set of default labels may be implemented and treated consistently and thereby cannot be abused by attackers. In some examples, metadata could directly contain all the boundary labels that apply to an object. In some examples, metadata can be variable sized. In some examples, labels can be additive, such that only a single label is needed per object, but the semantics of all the necessary boundary conditions are implied by the single label. The hash map method described herein suggests that a hash function exists that can map the boundary-set label to multiple other labels each having distinct semantics. Combinations of the above metadata examples are also possible. In some examples, commonly used labels might be included directly, while labels used less frequently can use another of the approaches described above and thereby require more involved processing.

Thus, the example access evaluator 1335 is an example means for determining whether a data access attempt will cause data specified in a data access attempt to cross a data boundary. Similarly, the example operations determiner is an example means for determining an operation to be applied to the data. And the example operation executor is an example of means for applying the operation to the data.

Referring still to FIG. 14, the capturing and representing of various aspects of an accessor entity is performed to reflect that entities ("subjects performing an access") can have a variety of different roles and group-memberships that need to be associable with the entity in a manner that supports easy discovery without requiring explicit identification. For example, where an accessing-entity is searching for data for personal use and where the data is not sensitive in any way (i.e., the data is being freely furnished by an information portal), there may be no need to find out the identity of the accessing-entity before the data access is evaluated. In some such examples, the entity metadata for that user can be a default (except for any cookies that may be sent by the user's device or a browser device or a browser to the portal). In contrast, if the same accessing entity is accessing a publication to which the accessing-entity is entitled to access by virtue of being a member of a group, then the accessing-entity's identity metadata furnished to the data access intermediary service need not go beyond parameters associated with the group member identity metadata.

Figure 15:
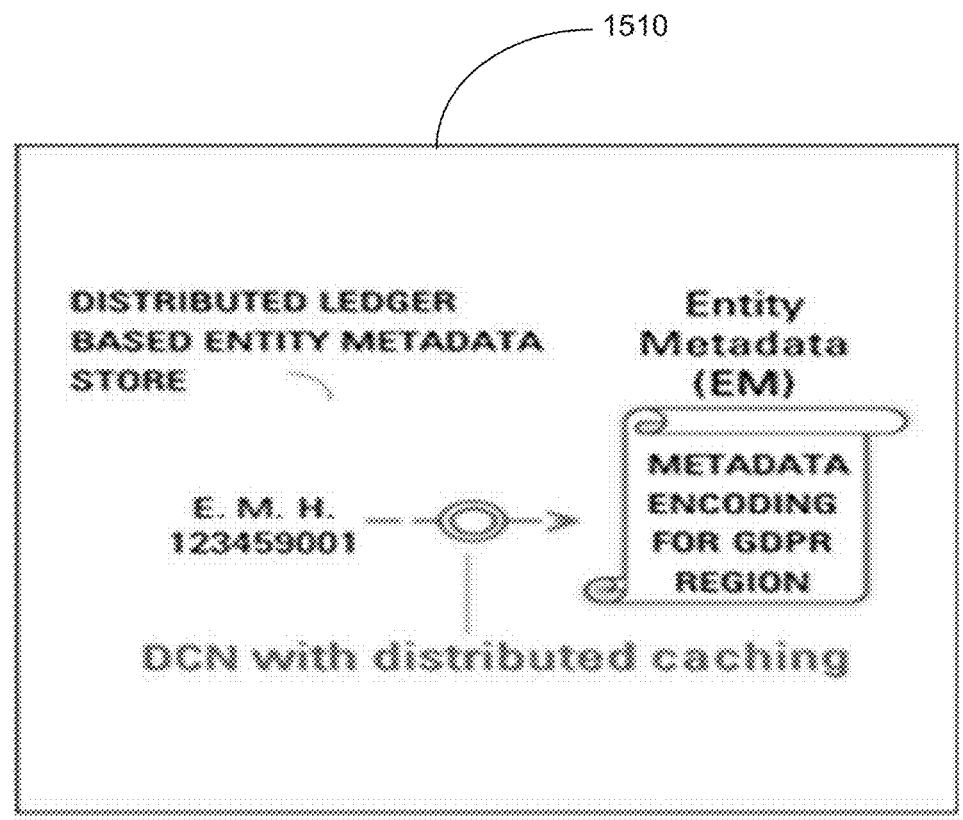
FIG. 15 illustrates a ledger-based entity metadata store distributed with data centric network caching and used to determine entity metadata for a data-accessor.

FIG. 15 illustrates a distributed ledger-based entity metadata store 1510 that uses the entity metadata handles 1420 of FIG. 14 to identify either concise or detailed representations of the corresponding entities. In some examples, the distributed ledger-based entity metadata store is implemented in the data access intermediary service 830 of the in the edge gateway 720. In some examples, the identification of these representations can be achieved by a distributed key value store. In some examples, a data centric network layer that permits retrieval on the basis of an identifier (a name, a UUID, etc), can be used. Such a data centric layer can use in-network distributed caching and in-network security (integrity-protected name-to-data mappings) to provide both performance and resilience. In one example of many, an accessing-entity's jurisdiction is general data protection regulation ("GDPR"), and the entity metadata handle (EMH) is "123459001". In such an example, the EMH "123459001" can be used to produce a record, a document, a tuple, etc., containing the access control metadata (also referred to as entity metadata here) applicable to any entity whose entity metadata handle is "123459001." The entity metadata, since the accessing entity's jurisdiction is "GDPR," furnishes the information access and processing rules that apply in the GDPR region to the accessing entity under EMH "123459001." In particular, the information access and processing rules may describe various types of information and the rules for accessing, storing and transmitting each of various types of information, while not containing anything for information of a default type. The information types are concisely captured in the boundary labels or boundary-set labels, and may refer to information of different categories—such as, "default," "personal but non-identifiable," "personal and identifiable up to gender and age only," etc. It is noted that, in some examples, boundary labels and boundary-set labels are fixed width constants (which can be, for example, 8 or 16 bytes long), that can refer to a database, a key value store, etc. so that even a complex information type such as "personal information containing age and medical history without gender identity and religious affiliation" does not require a lot of space to encode. For each type of information, the "entity metadata" document specifies the access control, storage control, encryption control requirements, etc., applicable to the accessing entity having the EMH "123459001." It is noted that, in such an example, an intent can be to simplify the data access process employed by the data access intermediary service 830 as the vast majority of neutral content types is not subject to any boundary crossing scrutiny (e.g., is not subject to GDPR privacy regulation), so that, for such content, there is no need to specify the applicable access, storage or communication rules.

Figure 16:
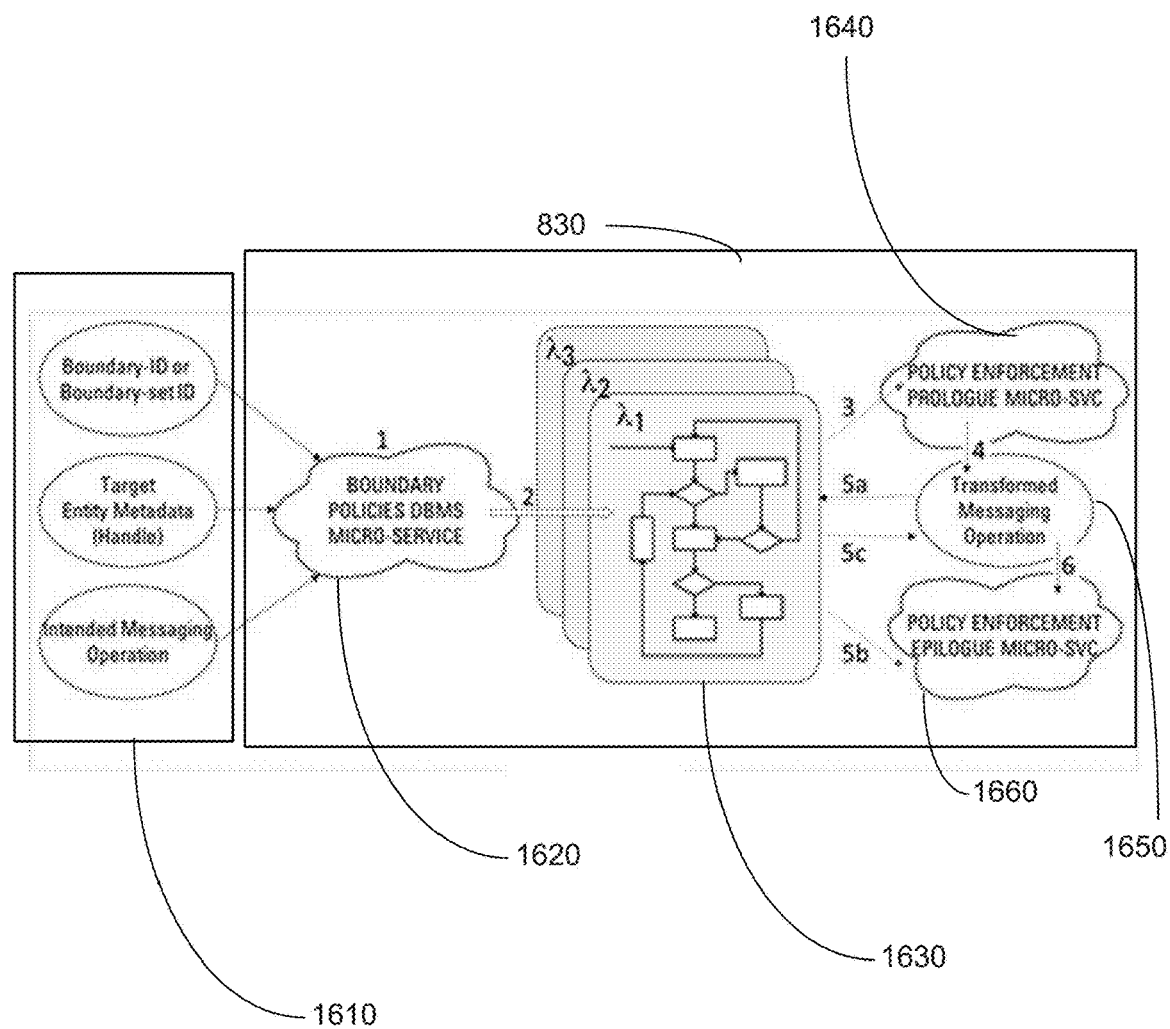
FIG. 16 represents a data access flow through the data access intermediary service of FIG. 8 and FIG. 13.

FIG. 16 illustrates a flow of information through the example data access intermediary service 830 of FIGS. 8 and 13. In some examples, first information 1610 includes the boundary-ID or boundary-set ID, the target entity metadata handle, and the context information (referred to in the figure as the intended message operation). The first information is provided to the data access intermediary service 830 (FIG. 13). In some examples, a first part of the data access intermediary service 830 represented in FIG. 16 is illustrated as a boundary policies database management system microservice 1620. In some examples, the boundary policies database management system microservice can implement the example access evaluator 1335, the example access controller 1340, the example accessing entity verifier 1345, and the example operations determiner 1350 of FIG. 13. In some examples, the first information 1620 is evaluated and the resulting information is provided from the boundary policies database management system microservice 1620 to a second part of the data access intermediary service 830 represented in FIG. 16. In some examples, the second part of the intermediary data access service is illustrated as a set of operations 1630 to be performed on the object (data) prior to permitting access to the data. In some examples, the set of operations 1630 can be performed by the operation applier 1360 of FIG. 13. Next, the results of one or more of the operations flow to an example policy enforcement prologue microservice 1640 which can be used to implement the example prologue policy enforcer 1365 of FIG. 13. The information is then operated on by a transformed messaging operation 1650 which can be used to implement the content transformer 1370 of FIG. 13.

In some examples, the transformed information/content can flow back to the operations applier 1630 where additional aspects/equations of the operations can be applied to the transformed information. In some examples, the results of such operations on the transformed information can again be transformed using the transformed messaging operation 1650. In some examples, after all operations have been applied, the resulting transformed content flows to a policy enforcement epilogue micro-service 1660 which can be used to implement the example epilogue policy enforcer 1375 of FIG. 13. In some examples, the results of additional operations that are performed by the operation applier 1360 can be transferred directly to the example policy enforcement epilogue micro-service 1360. Likewise, in some examples, the information transformed by the transformed message operation 1650 can be transmitted directly to the policy enforcement epilogue microservice 1660 when additional operations are not to be applied. The number of times the information is operated on and transformed depends on the operations which are designed to enforce one or more policies that restrain (or permit), as needed, access to the data.

While an example manner of implementing the example first data labeler 840 of FIG. 9 and the example data access intermediary service 830 are illustrated in FIGS. 8 and 13, one or more of the elements, processes and/or devices illustrated in FIGS. 8-13 may be combined, divided, re-arranged, omitted, eliminated and/or implemented in any other way. Further, the example object creator 910, the example object metadata label generator 920, the example sub-object metadata label generator 930, the example object collection metadata label generator 940, the example data to label mapper 950, the example data request receiver 1310, the example request parser 1315, the example context determiner 1320, the example object with boundary label/boundary-set label extractor 1325, the example entity label extractor 1330, the example access evaluator 1335, the example access controller 1340, the example accessing entity verifier 1345, the example operations determiner 1350, the example operation executor, the example operation applier 1360, the example prologue policy enforcer 1365, the example content transformer 1370, the example epilogue policy enforcer 1375, the example second data labeler 1377, the example escalator, the example filter 1385, the example alert generator 1390, the example distributed ledger-based logger 1392, the example logger/blockchain generator/signor 1394, the example logger block chain generator/signor 1394, the example auditor 1396 and/or, more generally, the example first data labeler 840 of FIG. 9 and/or the example data access intermediary service 830 of FIG. 13 may be implemented by hardware, software, firmware and/or any combination of hardware, software and/or firmware. Thus, for example, any of the example object creator 910, the example object metadata label generator 920, the example sub-object metadata label generator 930, the example object collection metadata label generator 940, the example data to label mapper 950, the example data request receiver 1310, the example request parser 1315, the example context determiner 1320, the example object with boundary label/boundary-set label extractor 1325, the example entity label extractor 1330, the example access evaluator 1335, the example access controller 1340, the example accessing entity verifier 1345, the example operations determiner 1350, the example operation executor, the example operation applier 1360, the example prologue policy enforcer 1365, the example content transformer 1370, the example epilogue policy enforcer 1375, the example second data labeler 1377, the example escalator, the example filter 1385, the example alert generator 1390, the example distributed ledger logger 1392, the example logger/blockchain generator/signor 1394, the example auditor 1396 and/or, more generally, the example first data labeler 840 of FIG. 9, and the example data access intermediary service 830 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example object creator 910, the example object metadata label generator 920, the example sub-object metadata label generator 930, the example object collection metadata label generator 940, the example data to label mapper 950, the example data request receiver 1310, the example request parser 1315, the example context determiner 1320, the example object with boundary label/boundary-set label extractor 1325, the example entity label extractor 1330, the example access evaluator 1335, the example access controller 1340, the example accessing entity verifier 1345, the example operations determiner 1350, the example operation executor, the example operation applier 1360, the example prologue policy enforcer 1365, the example content transformer 1370, the example epilogue policy enforcer 1375, the example second data labeler 1377, the example escalator, the example filter 1385, the example alert generator 1390, the example distributed ledger logger 1392, the example logger/blockchain generator/signor 1394, the example logger block chain generator/signor 1394, and/or the example auditor 1396 is/are hereby expressly defined to include a non-transitory computer readable storage device or storage disk such as a memory, a digital versatile disk (DVD), a compact disk (CD), a Blu-ray disk, etc. including the software and/or firmware. Further still, the example data request receiver 1310, the example object creator 910, the example object metadata label generator 920, the example sub-object metadata label generator 930, the example object collection metadata label generator 940, the example data to label mapper 950, the example request parser 1315, the example context determiner 1320, the example object with boundary label/boundary-set label extractor 1325, the example entity label extractor 1330, the example access evaluator 1335, the example access controller 1340, the example accessing entity verifier 1345, the example operations determiner 1350, the example operation executor, the example operation applier 1360, the example prologue policy enforcer 1365, the example content transformer 1370, the example epilogue policy enforcer 1375, the example second data labeler 1377, the example escalator 1380, the example filter 1385, the example alert generator 1390, the example distributed ledger logger 1392, the example logger/blockchain generator/signor 1394, the example logger block chain generator/signor 1394, and/or the example auditor 1396 may include one or more elements, processes and/or devices in addition to, or instead of, those illustrated in FIGS. 9 and 13, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 17A:
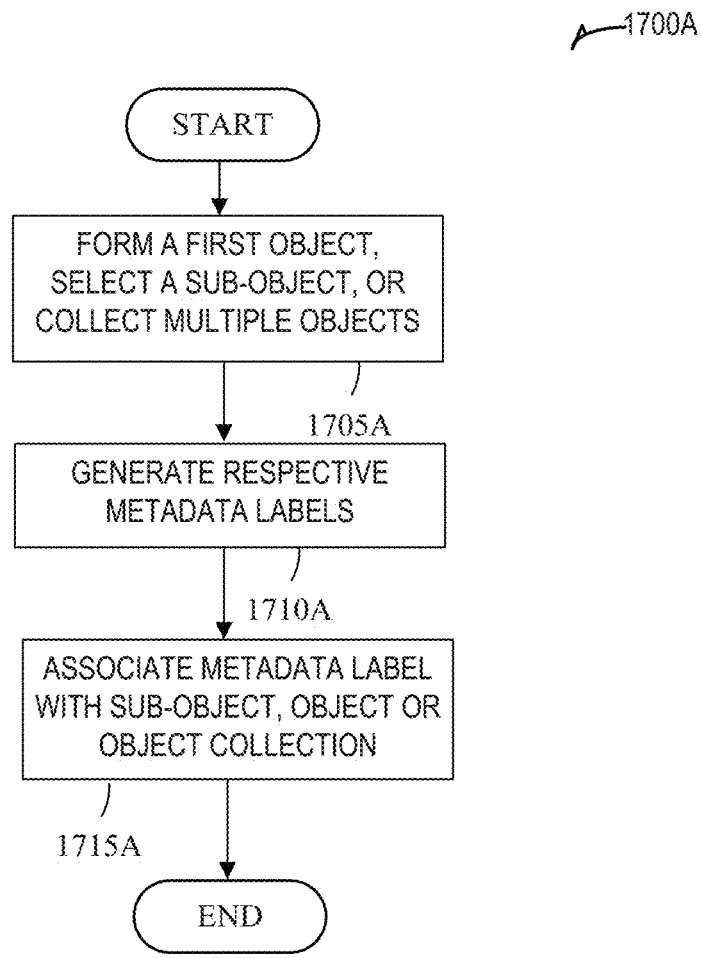
FIG. 17A is a flowchart representative of machine readable instructions which may be executed to implement the object labeler of FIG. 8.
Figure 17B:
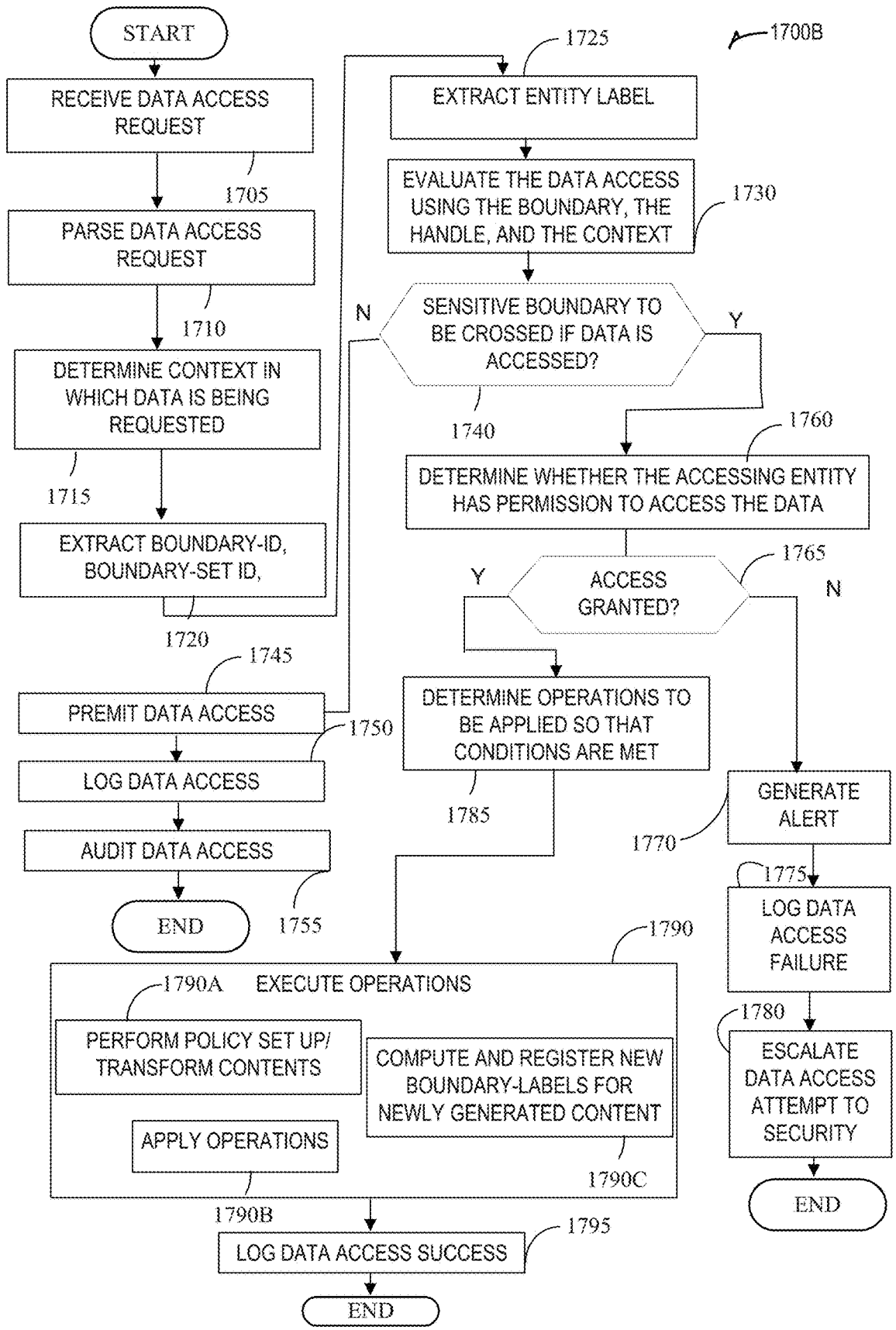
FIG. 17B is a flowchart representative of machine readable instructions which may be executed to implement the example data access intermediary service of FIG. 8 and FIG. 13.
Figure 18A:
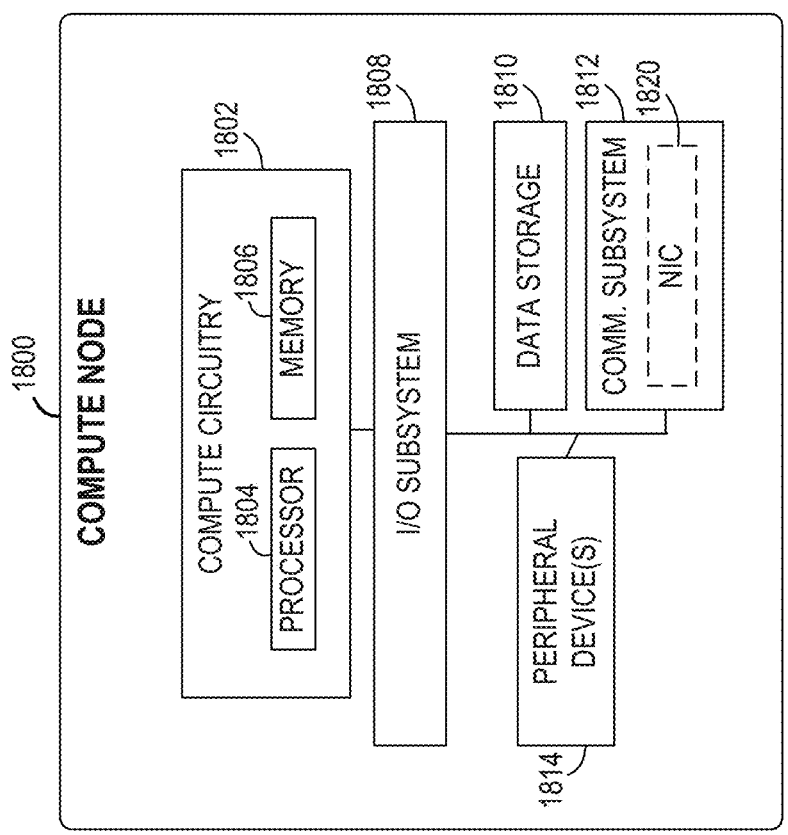
FIG. 18A is a block diagram of an example implementation of an example compute node that may be deployed in one of the edge computing systems illustrated in FIGS. 1-4, 6, 7, 8, 9, and/or 13.
Figure 18B:
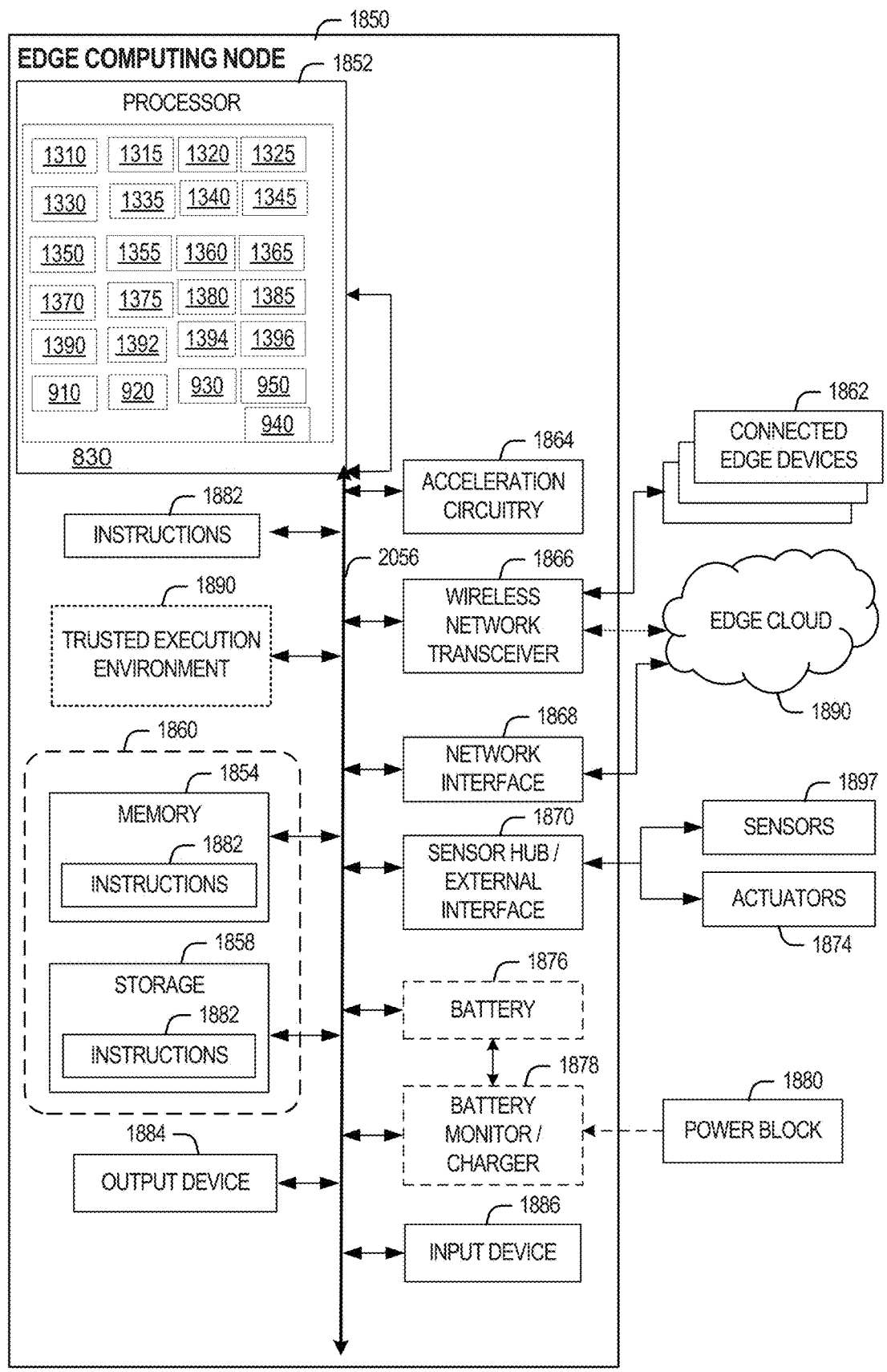
FIG. 18B is another block diagram of an example implementation of an example compute node that may be deployed in one of the edge computing systems illustrated in FIGS. 1-4, 6, 7, 8, 9, and/or 13.

Flowcharts representative of example hardware logic, machine readable instructions, hardware implemented state machines, and/or any combination thereof for implementing the example data access intermediary service 830 of FIG. 13 and the example data labeler of FIG. 9 are shown in FIGS. 18A, 18B. The machine readable instructions may be one or more executable programs or portion(s) of an executable program for execution by a computer processor and/or processor circuitry, such as the processor 1812 shown in the example processor platform 1800 discussed below in connection with FIG. 18A. The program/programs may be embodied in software stored on a non-transitory computer readable storage medium such as a CD-ROM, a floppy disk, a hard drive, a DVD, a Blu-ray disk, or a memory associated with the processor 1812, but the entire program and/or parts thereof could alternatively be executed by a device other than the processor 1812 and/or embodied in firmware or dedicated hardware. Further, although the example programs are described with reference to the flowcharts illustrated in FIGS. 11-18, many other methods of implementing the example platforms of the three tier network 700 of FIG. 7, the example devices of FIG. 8, the example overlay 850 of FIG. 9 and the example second node of FIG. 8 and FIG. 10 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 11-17 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the terms non-transitory computer readable medium and non-transitory machine readable medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Data Object Labeler

FIG. 17A is a flowchart representative of machine readable instructions which may be executed to implement the object labeler of FIG. 8 and FIG. 9. The example program 1700A begins at a block 1705A at which the example object creator 910 (FIG. 9) forms a first object, selects a sub-object or collects multiple objects to form an object collection. The example object metadata label generator 920, the example sub-object metadata label generator 930, the example object collection metadata label generator 940, respectively, generate metadata labels corresponding to a respective sub-object, object or object collection (block 1710A). The data-to-label mapper 950 is used to associated each of the metadata labels with the corresponding one of the sub-objects, object, and collections of objects (block 1715A). The program 1700A then returns to block 1705A and block subsequent thereto to continue a data label generating and mapping. It is noted that the object (or sub-object, or object collection, as the case may be) and corresponding metadata travel together when the object is requested (or sub-object, or object collection) in a data access attempt or as the sub-object, object, and/or object collection travel through the network 700.

Data Access Intermediary Service

FIG. 17B is an example program 1700 to implement the example data access intermediary service of FIG. 13. The example program 1700 of FIG. 17 begins at a block 1705 at which a request for data access is received at the data request receiver 1310. In some examples, the request for data access can include a request to access data (e.g., in an object) (collectively or individually) located at any level including the data member (sub-object) level, the object level, the object collection level and any of the possible variations thereof. In some examples, the request/data parser 1315 parses the data access request into different portions (block 1710). In some examples, the context determiner 1320 can determine a context (C) in which the data is being requested (e.g., the type of access requested and why the access is being requested) (block 1715). In some examples, the context in which an access is performed can be determined implicitly based on entity information (e.g., the entity label and/or entity metadata M (described further below)) that is among the portions of the parsed request. In some examples, the object boundary label and/or the boundary-set label extractor 1325 extracts the boundary-ID and the object boundary set-ID, respectively, and, in some examples, can also determine which of the metadata parsed by the request parser 1315 represents the object boundary label and/or the boundary-set label, (B) etc. (block 1720). Next, the example entity label extractor 1330 can extract the entity label (M) from among the metadata separated by the parser 1315 (block 1725).

In some examples, the example access evaluator 1335 can then evaluate the data access request using the context information (C), the entity metadata M, and the object with the boundary label/boundary-set label (B)(block 1730).

If the evaluation performed by the example access evaluator 1335 (FIG. 13) determines (block 1740) that a sensitive boundary crossing event will not occur access to the data is permitted by the access controller 1340 (block 1745). In some examples, when access to the data is permitted, the data access is logged by the example logger/blockchain generator/signor 1394 (block 1750), and the data access is audited by the example auditor 1396 (block 1755). Thereafter, the data access program ends and but can be subsequently performed for future data access requests/attempts.

If the evaluation performed by the example access evaluator 1335 (FIG. 13) indicates a sensitive boundary will be crossed were the data access to occur (as determined at block 1740), the example access controller 1340 notifies the example accessing-entity verifier 1345 which uses the entity information (e.g., the entity metadata M) to identify the accessing entity and to determine whether the accessing entity has permission to access the data/object (block 1760). If access is not granted (block 1765), the example alert generator 1390 will generate an alert (block 1770), if needed, the logger will log the attempt to access the data block 1775 as a failure), and the example escalator 1380 will escalate the attempt to access the data to further security systems (block 1780), if needed. Thereafter the program 1700 ends.

If access to the data by the entity is granted (block 1765) by the accessing-entity verifier 1345, the example operation determiner determines a set of operations to be applied to the data to be accessed (block 1785) and the example operation executor 1355 executes the operations (block 1790). Applying the operations to the data causes conditions associated with access of the data to be met. In some examples, a number of operations are determined/identified and, in some such examples, are chained together such that the operations are performed in a sequential order.

In some examples, executing the operations (block 1790) includes three parts. In a first part, the example policy enforcer prologue performs a policy setup (block 1790A). In the first part, the example content transformer 1370 can also transform the contents of the object as needed. In a second part, the operation applier 1360 applies the operations to the example transformed contents (block 1790B). In some examples, applying the various operations can include logging parts of the results of an operation, data-loss protecting parts of the results of an operation by inserting an indirection, etc.

In a third part, the example epilogue policy enforcer 1375 performs any finalization steps (block 1790C) that may include, in some examples, computing and registering any boundary-labels associated with the newly generated content that resulted from applying the operations to the content. After the epilogue policy enforcer 1375 has operated, the example distributed ledger-based logger 1392 can log the success of the data access in a distributed ledger (block 1795) and the program 1700 terminates and is performed again when future data access attempts occur.

In some examples, for efficiency, the operations described in connection with the data access intermediary service 830 can be employed at any desired points in the three tier network 700 (FIG. 7) including at the gateway nodes at the network edge.

FIG. 18A is a block diagram of an example implementation of an example edge compute node 1800 that includes a compute engine (also referred to herein as "compute circuitry") 1802, an input/output (I/O) subsystem 1808, data storage 1810, a communication circuitry subsystem 1812, and, optionally, one or more peripheral devices 1814. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component. The example edge compute node 1800 of FIG. 18 may be deployed in one of the edge computing systems illustrated in FIGS. 1-4, 6, 9 and/or 13 to implement any edge compute node of FIGS. 1-4, 6, 9 and/or 13.

The compute node 1800 may be embodied as any type of engine, device, or collection of devices capable of performing various compute functions. In some examples, the compute node 1800 may be embodied as a single device such as an integrated circuit, an embedded system, a field-programmable gate array (FPGA), a system-on-a-chip (SOC), or other integrated system or device. In the illustrative example, the compute node 1800 includes or is embodied as a processor 1804 and a memory 1806. The processor 1804 may be embodied as any type of processor capable of performing the functions described herein (e.g., executing an application). For example, the processor 1804 may be embodied as a multi-core processor(s), a microcontroller, a processing unit, a specialized or special purpose processing unit, or other processor or processing/controlling circuit.

In some examples, the processor 1804 may be embodied as, include, or be coupled to an FPGA, an application specific integrated circuit (ASIC), reconfigurable hardware or hardware circuitry, or other specialized hardware to facilitate performance of the functions described herein. Also, in some examples, the processor 1804 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1804 may work in coordination with each other to execute many types of operations and instructions within and on behalf of the compute node 1800.

The memory 1806 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1806 may be integrated into the processor 1804. The memory 1806 may store various software and data used during operation such as one or more applications, data operated on by the application(s), libraries, and drivers.

The compute circuitry 1802 is communicatively coupled to other components of the compute node 1800 via the I/O subsystem 1808, which may be embodied as circuitry and/or components to facilitate input/output operations with the compute circuitry 1802 (e.g., with the processor 1804 and/or the main memory 1806) and other components of the compute circuitry 1802. For example, the I/O subsystem 1808 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1808 may form a portion of a system-on-a-chip (SoC) and be incorporated, along with one or more of the processor 1804, the memory 1806, and other components of the compute circuitry 1802, into the compute circuitry 1802.

The one or more illustrative data storage devices 1810 may be embodied as any type of devices configured for short-term or long-term storage of data such as, for example, memory devices and circuits, memory cards, hard disk drives, solid-state drives, or other data storage devices. Individual data storage devices 1810 may include a system partition that stores data and firmware code for the data storage device 1810. Individual data storage devices 1810 may also include one or more operating system partitions that store data files and executables for operating systems depending on, for example, the type of compute node 1800.

The communication circuitry 1812 may be embodied as any communication circuit, device, or collection thereof, capable of enabling communications over a network between the compute circuitry 1802 and another compute device (e.g., an edge gateway of an implementing edge computing system). The communication circuitry 1812 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1812 includes a network interface controller (NIC) 1820, which may also be referred to as a host fabric interface (HFI). The NIC 1820 may be embodied as one or more add-in-boards, daughter cards, network interface cards, controller chips, chipsets, or other devices that may be used by the compute node 1800 to connect with another compute device (e.g., an edge gateway node). In some examples, the NIC 1820 may be embodied as part of a system-on-a-chip (SoC) that includes one or more processors, or included on a multichip package that also contains one or more processors. In some examples, the NIC 1820 may include a local processor (not shown) and/or a local memory (not shown) that are both local to the NIC 1820. In such examples, the local processor of the NIC 1820 may be capable of performing one or more of the functions of the compute circuitry 1802 described herein. Additionally, or alternatively, in such examples, the local memory of the NIC 1820 may be integrated into one or more components of the client compute node at the board level, socket level, chip level, and/or other levels.

Additionally, in some examples, a respective compute node 1800 may include one or more peripheral devices 1814. Such peripheral devices 1814 may include any type of peripheral device found in a compute device or server such as audio input devices, a display, other input/output devices, interface devices, and/or other peripheral devices, depending on the particular type of the compute node 1800. In further examples, the compute node 1800 may be embodied by a respective edge compute node (whether a client, gateway, or aggregation node) in an edge computing system or like forms of appliances, computers, subsystems, circuitry, or other components.

In a more detailed example, FIG. 18B illustrates a block diagram of an example edge computing node 1850 structured to execute the instructions of FIGS. 17A and 17B to implement the techniques (e.g., operations, processes, methods, and methodologies) described herein such as the data access intermediary service 830 FIG. 8, and FIG. 13. This edge computing node 1850 provides a closer view of the respective components of node 1800 when implemented as or as part of a computing device (e.g., as a mobile device, a base station, server, gateway, etc.). The edge computing node 1850 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 1850, or as components otherwise incorporated within a chassis of a larger system. For example, the edge computing node 1850 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, an Internet of Things (IoT) device, or any other type of computing device.

The edge computing device 1850 may include processing circuitry in the form of a processor 1852, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1852 may be a part of a system on a chip (SoC) in which the processor 1852 and other components are formed into a single integrated circuit, or a single package, such as the Edison™ or Galileo™ SoC boards from Intel Corporation, Santa Clara, California. As an example, the processor 1852 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1852 and accompanying circuitry may be provided in a single socket form factor, multiple socket form factor, or a variety of other formats, including in limited hardware configurations or configurations that include fewer than all elements shown in FIG. 18B.

In examples in which the example data/object labeler 840 of FIG. 8 and FIG. 9 and the example data access intermediary service 830 of FIG. 8 and FIG. 13 are implemented on the example edge gateway 720, the example processor 1852 can be used to implement the elements/blocks of FIGS. 9 and 13 including the example the example object creator 910, the example object metadata label generator 920, the example sub-object metadata label generator 930, the example object collection metadata label generator 940, the example data to label mapper 950, the example data request receiver 1310, the example request parser 1315, the example context determiner 1320, the example object with boundary label/boundary-set label extractor 1325, the example entity label extractor 1330, the example access evaluator 1335, the example access controller 1340, the example accessing entity verifier 1345, the example operations determiner 1350, the example operation executor, the example operation applier 1360, the example prologue policy enforcer 1365, the example content transformer 1370, the example epilogue policy enforcer 1375, the example second data labeler 1377, the example escalator, the example filter 1385, the example alert generator 1390, the example distributed ledger-based logger 1392, the example logger/blockchain generator/signor 1394, the example logger block chain generator/signor 1394, the example auditor 1396 and/or, more generally, the example first data labeler 840 of FIG. 9 and/or the example data access intermediary service 830 of FIG. 13 may be implemented by hardware, software, firmware and/or any combination of hardware, software and/or firmware. Thus, for example, any of the example object creator 910, the example object metadata label generator 920, the example sub-object metadata label generator 930, the example object collection metadata label generator 940, the example data to label mapper 950, the example data request receiver 1310, the example request parser 1315, the example context determiner 1320, the example object with boundary label/boundary-set label extractor 1325, the example entity label extractor 1330, the example access evaluator 1335, the example access controller 1340, the example accessing entity verifier 1345, the example operations determiner 1350, the example operation executor, the example operation applier 1360, the example prologue policy enforcer 1365, the example content transformer 1370, the example epilogue policy enforcer 1375, the example second data labeler 1377, the example escalator, the example filter 1385, the example alert generator 1390, the example distributed ledger logger 1392, and/or the example logger/blockchain generator/signor 1394.

The processor 1852 may communicate with a system memory 1854 over an interconnect 1856 (e.g., a bus). Any number of memory devices may be used to provide for a given amount of system memory. As examples, the memory 1854 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1858 may also couple to the processor 1852 via the interconnect 1856. In an example, the storage 1858 may be implemented via a solid-state disk drive (SSDD). Other devices that may be used for the storage 1858 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. Any of the memories depicted in FIG. 18B can be used to implement the data/object storage.

In low power implementations, the storage 1858 may be on-die memory or registers associated with the processor 1852. However, in some examples, the storage 1858 may be implemented using a micro hard disk drive (HDD). Further, any number of new technologies may be used for the storage 1858 in addition to, or instead of, the technologies described, such resistance change memories, phase change memories, holographic memories, or chemical memories, among others.

The components may communicate over the interconnect 1856. The interconnect 1856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1856 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1856 may couple the processor 1852 to a transceiver 1866, for communications with the connected edge devices 1862. The transceiver 1866 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1862. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1866 (or multiple transceivers) may communicate using multiple standards or radios for communications at a different range. For example, the edge computing node 1850 may communicate with close devices, e.g., within about 10 meters, using a local transceiver based on Bluetooth Low Energy (BLE), or another low power radio, to save power. More distant connected edge devices 1862, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1866 (e.g., a radio transceiver) may be included to communicate with devices or services in the edge cloud 1895 via local or wide area network protocols. The wireless network transceiver 1866 may be a low-power wide-area (LPWA) transceiver that follows the IEEE 802.15.4, or IEEE 802.15.4g standards, among others. The edge computing node 1850 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1866, as described herein. For example, the transceiver 1866 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1866 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1868 may be included to provide a wired communication to nodes of the edge cloud 1895 or to other devices, such as the connected edge devices 1862 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1868 may be included to enable connecting to a second network, for example, a first NIC 1868 providing communications to the cloud over Ethernet, and a second NIC 1868 providing communications to other devices over another type of network.

Given the variety of types of applicable communications from the device to another component or network, applicable communications circuitry used by the device may include or be embodied by any one or more of components 1864, 1866, 1868, or 1870. Accordingly, in various examples, applicable means for communicating (e.g., receiving, transmitting, etc.) may be embodied by such communications circuitry.

The edge computing node 1850 may include or be coupled to acceleration circuitry 1864, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1856 may couple the processor 1852 to a sensor hub or external interface 1870 that is used to connect additional devices or subsystems. The devices may include sensors 1872, such as accelerometers, level sensors, flow sensors, optical light sensors, camera sensors, temperature sensors, global navigation system (e.g., GPS) sensors, pressure sensors, barometric pressure sensors, and the like. The hub or interface 1870 further may be used to connect the edge computing node 1850 to actuators 1874, such as power switches, valve actuators, an audible sound generator, a visual warning device, and the like.

In some optional examples, various input/output (I/O) devices may be present within or connected to, the edge computing node 1850. For example, a display or other output device 1884 may be included to show information, such as sensor readings or actuator position. An input device 1886, such as a touch screen or keypad may be included to accept input. An output device 1884 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 1850. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1876 may power the edge computing node 1850, although, in examples in which the edge computing node 1850 is mounted in a fixed location, it may have a power supply coupled to an electrical grid, or the battery may be used as a backup or for temporary capabilities. The battery 1876 may be a lithium ion battery, or a metal-air battery, such as a zinc-air battery, an aluminum-air battery, a lithium-air battery, and the like.

A battery monitor/charger 1878 may be included in the edge computing node 1850 to track the state of charge (SoCh) of the battery 1876, if included. The battery monitor/charger 1878 may be used to monitor other parameters of the battery 1876 to provide failure predictions, such as the state of health (SoH) and the state of function (SoF) of the battery 1876. The battery monitor/charger 1878 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1878 may communicate the information on the battery 1876 to the processor 1852 over the interconnect 1856. The battery monitor/charger 1878 may also include an analog-to-digital (ADC) converter that enables the processor 1852 to directly monitor the voltage of the battery 1876 or the current flow from the battery 1876. The battery parameters may be used to determine actions that the edge computing node 1850 may perform, such as transmission frequency, mesh network operation, sensing frequency, and the like.

A power block 1880, or other power supply coupled to a grid, may be coupled with the battery monitor/charger 1878 to charge the battery 1876. In some examples, the power block 1880 may be replaced with a wireless power receiver to obtain the power wirelessly, for example, through a loop antenna in the edge computing node 1850. A wireless battery charging circuit, such as an LTC4020 chip from Linear Technologies of Milpitas, California, among others, may be included in the battery monitor/charger 1878. The specific charging circuits may be selected based on the size of the battery 1876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1858 may include instructions 1882 in the form of software, firmware, or hardware commands to implement the techniques described herein. Although such instructions 1882 are shown as code blocks included in the memory 1854 and the storage 1858, it may be understood that any of the code blocks may be replaced with hardwired circuits, for example, built into an application specific integrated circuit (ASIC).

In an example, the instructions 1882 provided via the memory 1854, the storage 1858, or the processor 1852 may be embodied as a non-transitory, machine-readable medium 1860 including code to direct the processor 1852 to perform electronic operations in the edge computing node 1850. The processor 1852 may access the non-transitory, machine-readable medium 1860 over the interconnect 1856. For instance, the non-transitory, machine-readable medium 1860 may be embodied by devices described for the storage 1858 or may include specific storage units such as optical disks, flash drives, or any number of other hardware devices. The non-transitory, machine-readable medium 1860 may include instructions to direct the processor 1852 to perform a specific sequence or flow of actions, for example, as described with respect to the flowchart(s) and block diagram (s) of operations and functionality depicted above. As used herein, the terms "machine-readable medium" and "computer-readable medium" are interchangeable.

Also in a specific example, the instructions 1882 on the processor 1852 (separately, or in combination with the instructions 1882 of the machine readable medium 1860) may configure execution or operation of a trusted execution environment (TEE) 1890. In an example, the TEE 1890 operates as a protected area accessible to the processor 1852 for secure execution of instructions and secure access to data. Various implementations of the TEE 1890, and an accompanying secure area in the processor 1852 or the memory 1854 may be provided, for instance, through use of Intel® Software Guard Extensions (SGX) or ARM® Trust-Zone® hardware security extensions, Intel® Management Engine (ME), or Intel® Converged Security Manageability Engine (CSME). Other aspects of security hardening, hardware roots-of-trust, and trusted or protected operations may be implemented in the device 1850 through the TEE 1890 and the processor 1852.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 19:
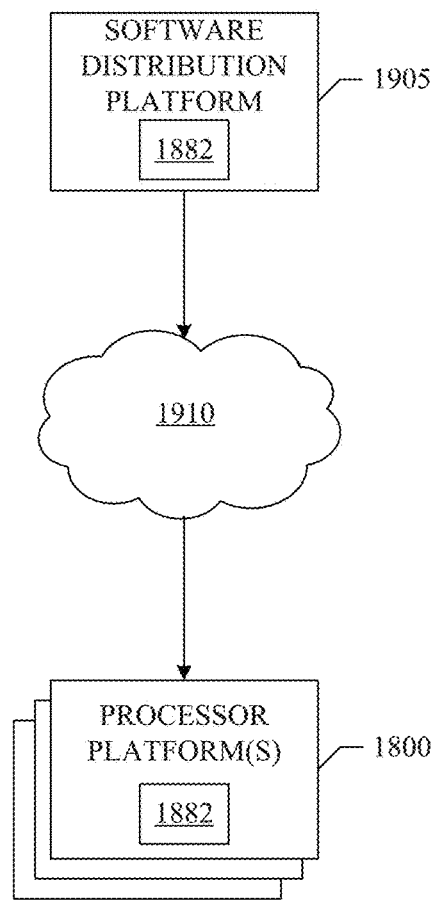
FIG. 19 is a block diagram of an example software distribution platform to distribute software (e.g., software corresponding to the example computer readable instructions of FIGS. 17A and 17B to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1905 to distribute software such as the example computer readable instructions of FIGS. 18A/B to third parties is illustrated in FIG. 19. The example software distribution platform 1905 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1882 of FIGS. 17A/B. The third parties may be consumers, users, retailers, OEMs, etc., who purchase and/or license the software for use and/or re-sale and/or sub-licensing. In the illustrated example, the software distribution platform 1905 includes one or more servers and one or more storage devices. The storage devices store the computer readable instructions 1882, which may correspond to the example computer readable instructions of FIGS. 17A/B, as described above. The one or more servers of the example software distribution platform 1905 are in communication with a network 1910, which may correspond to any one or more of the Internet and/or any of the example networks 700 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1882 from the software distribution platform 1905. For example, the software, which may correspond to the example computer readable instructions of FIGS. 17A/B, may be downloaded to the example processor platform 1900, which is to execute the computer readable instructions 1882 to implement the example data access intermediary service 830 of FIG. 8 and FIG. 13 and/or the data/object labeler 840 (FIG. 9). In some examples, one or more servers of the software distribution platform 1905 periodically offer, transmit, and/or force updates to the software (e.g., the example computer readable instructions 1882 of FIGS. 18A/B) to ensure improvements, patches, updates, etc. are distributed and applied to the software at the end user devices.

From the foregoing, it will be appreciated that example methods, apparatus and articles of manufacture have been disclosed that permit access (or not) to data based on boundary labels that travel with the data. The boundary labels are evaluated in connection with the entity accessing the data, and a context in which the entity is accessing the data to determine whether the data access will cause a sensitive boundary to be crossed. If so, the boundary and other information is used to compute/identify a set of operations to be applied to the data before the access may occur. Applying the operations to the data allows conditions associated with the data to be met so that the boundary remains secure. The boundaries are evaluated at edge gateways at which the data access is being attempted.

Further, performing various filtering operations on an object using a boundary labels, a context, and entity information can cause new data objects to be created. In some examples, the new data objects are created as the predecessor data object is subject to unions, intersections, and varieties of other transformations. In some examples, who/ what is authorized to specify a boundary and who/what recognizes the boundary specification can be managed by a control plane. Such a control plane can be accessed by data/object owners to institute policy mechanisms. Policy can be applied in two distinct ways. For one, the policy can be used to interpret boundary labels and related authorization validity; and for another, the policy can specify who/what is authorized to specify/create/remove/revoke boundary labels, and for still another, a policy can be configured to recognize naming conventions that agree on name syntax and semantics. The methods, apparatus and systems disclosed herein are a further improvement on conventional data control system by including auditing and triggering mechanisms that control the authenticity of the data and accompanying label and that can cause a different policy to be derived and applied when a transformation results in a new data object. In addition, the labels disclosed herein can be governed by label ontologies that focus on a vocabulary of 'boundaries' and, more importantly, that include conventions for automatically affixing the labels as data crosses a boundary.

Moreover, objects disclosed herein accrete boundary labeling through movement across boundary-aware data processing infrastructures. Objects can consist of just data or a nesting of data+metadata. Objects having labeling metadata are said to be "nested objects". Nested objects can have layers of integrity or confidentiality protected inner objects. The lambda functions disclosed herein know how to detect and process nested object layers, peeling off and processing the boundary label that applies to each nested object. In addition, boundary-crossing operations, responsive actions and results, are captured into distributed ledgers that can span network devices.

The Lambda functions can log or track object boundary crossings as a form of telemetry and analytics to analyze the overall behavior of Lambda functions as Objects snowball and "melt" as part of their transit across edge infrastructure. Since security and access control are part of boundary-aware data and since cryptography is the known to protect integrity and confidentiality in distributed infrastructures, key management will track or anticipate the data transiting behavior.

In the methods, apparatus and systems disclosed herein, caching can be used to create redundant copies of data objects. This redundancy creates the potential for update inconsistency. Reference counting is one possible way to gain insights regarding redundancy lifecycle (creation, update, deletion). And, privacy requirements mandate accurate tracking of redundant objects so that copies of data that is securely deleted can attest to their removal. By providing data access security the methods, systems, and apparatus disclosed herein improve the operation of computer, computer networks.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to enforce data boundaries through the use of boundary labels are disclosed herein. Further examples and combinations thereof include the following:

Example 1 includes an apparatus of an edge gateway, the apparatus comprising an access evaluator to determine whether a data access will cause data specified by a data access attempt to cross a data boundary, the data boundary associated with at least one condition to be met before the data will be permitted to cross the boundary, a boundary label included with the data, the boundary label used by the access evaluator to determine whether the data access will cause the data of the data access attempt to cross the data boundary, an operations determiner to determine an operation to be applied to the data for which access is being attempted, in response to determining the data access attempt will cause the data to cross the data boundary, and an operation applier to apply the operation to the data, the application of the operation to the data to cause the at least one condition to be met, and the application of the operation to cause the data access to occur subject to the at least one condition.

Example 2 includes the apparatus of example 1, wherein the data is a data object, the boundary label travels in a data flow with the data object, and the boundary label includes metadata.

Example 3 includes the apparatus of example 1, wherein the operations determiner is to determine a plurality of operations to be applied, the plurality of operations to be performed in a sequential manner.

Example 4 includes the apparatus of example 1, wherein the data is a data object, the application of the operation causes a new data object to be created, and the apparatus further includes an epilogue policy enforcer to generate a boundary for the new data object, the boundary to be added to the new data object in the form of metadata.

Example 5 includes the apparatus of example 1, wherein the access evaluator is to determine whether the data access will cause the data of the data access attempt to cross the data boundary by evaluating the boundary label, an entity label associated with an entity attempting the data access, and a context in which the data access is being attempted.

Example 6 includes the apparatus of example 5, wherein the boundary label is a boundary metadata and the entity label is an entity metadata and the access evaluator is to evaluate the boundary label by applying a function to the boundary metadata, the entity metadata and to the context.

Example 7 includes the apparatus of example 2, wherein the metadata for the data object is an object boundary metadata, the data object includes sub-objects, and respective ones of the sub-objects have respective sub-object boundary metadata.

Example 8 includes the apparatus of example 7, wherein the access evaluator is to apply a function to the object boundary, and to a respective first sub-object boundary of a respective first one of the sub-objects to determine whether an attempt to access the first sub-object will cause the first sub-object to cross the data boundary.

Example 9 includes a non-transitory machine readable medium comprising instructions that, when executed by at least one processor, cause the at least one processor to at least determine whether a data access attempt, if permitted, will cause the data specified in the data access attempt to cross a data boundary, the data boundary associated with at least one condition to be met before the data will be permitted to cross the boundary, determine an operation to be applied to the data for which access is being attempted, in response to determining the data access attempt will cause the data to cross the data boundary, and apply the operation to the data, the application of the operation to the data to cause the at least one condition to be met, and the application of the operation to permit the data access to be permitted under the at least one condition.

Example 10 includes the non-transitory computer readable medium of example 9, wherein the data is a data object and the boundary label is associated with the data object and is attached to the data object in the form of metadata.

Example 11 includes the non-transitory computer readable medium of example 9, wherein the operation include a plurality of operations, the plurality of operations to be applied to the data object in a sequential manner.

Example 12 includes the non-transitory machine readable instructions of example 9, wherein the data is a data object, the application of the operation causes a new object to be created, and the instructions further cause the at least one processor to generate a boundary for the new object, the boundary to be associated with the new object in the form of metadata.

Example 13 includes the non-transitory machine readable instructions of example 9, wherein the instructions cause the at least one processor to determine whether the data access will cause the data specified in the data access attempt to cross the data boundary by evaluating a boundary label, an entity label associated with an entity attempting the data access and a context in which the data access is being attempted.

Example 14 includes the non-transitory machine readable medium of example 13, wherein the boundary label is a boundary metadata, the entity label is an entity metadata, and the instructions cause the at least one processor to determine whether the data access attempt will cause the data specified in the data access attempt to cross the data boundary by applying a function to the boundary metadata, the entity metadata and to the context.

Example 15 includes the non-transitory machine readable medium of example 10, wherein the metadata for the data object is object boundary metadata, the data object includes sub-objects, and respective ones of the sub-objects have respective sub-object boundary metadata.

Example 16 includes the non-transitory machine readable medium of example 15, wherein the instructions cause the at least one processor to determine whether a data access attempt will cause the data specified in the data access attempt to cross the data boundary, by applying a function to the object boundary, and to a respective first sub-object boundary of a respective first one of the sub-objects to determine whether an attempt to access the first sub-object will cause the first sub-object to cross a data boundary.

Example 17 includes a method comprising determining whether a data access attempt, if permitted, will cause data specified in the data access attempt to cross a data boundary, the data boundary associated with at least one condition to be met before the data will be permitted to cross the boundary, determining an operation to be applied to the data for which access is being attempted, in response to determining the data access attempt will cause the data to cross a data boundary, and applying the operation to the data, the application of the operation to the data to cause the at least one condition to be met, and the application of the operation to permit the data access to be permitted under the at least one condition.

Example 18 includes the method of example 17 wherein the data is a data object and the boundary label is associated with the data object and is attached to the data object in the form of data object metadata.

Example 19 includes the method of example 18, wherein the metadata for the data object is an object boundary metadata, the data object includes sub-objects, and respective ones of the sub-objects have respective sub-object boundary metadata.

Example 20 includes the method of example 17, wherein the operation includes a plurality of operations, the plurality of operations to be applied to the data object in a sequential manner.

Example 21 includes the method of example 17, wherein the data is a data object, applying the operation to the data object causes a new object to be created, and the method further includes generating a new boundary for the new object, the new boundary to be associated with the new object in the form of new object metadata.

Example 22 includes the method of example 17, wherein determining whether the data access will cause the data specified in the data access attempt to cross the data boundary includes evaluating a boundary label, an entity label associated with an entity attempting the data access and a context in which the data access is being attempted.

Example 23 includes the method of example 22, wherein the boundary label is a boundary metadata, the entity label is an entity metadata, and wherein determining whether the data access will cause the data specified in the data access attempt to cross the data boundary includes applying a function to the boundary metadata, the entity metadata, and the context.

Example 24 includes the method of example 23, further including applying a function to the object boundary, and to a respective first sub-object boundary of a respective first one of the sub-objects to determine whether an attempt to access the first sub-object will cause the first sub-object to cross the data boundary.

Example 25 includes an apparatus comprising means for determining whether a data access attempt, if permitted, will cause data specified in the data access attempt to cross a data boundary, the data boundary associated with at least one condition to be met before the data will be permitted to cross the boundary, means for determining an operation to be applied to the data for which access is being attempted, in response to determining the data access attempt will cause the data to cross a data boundary, and means for applying the operation to the data, the application of the operation to the data to cause the at least one condition to be met, and the application of the operation to permit the data access to be permitted under the at least one condition.

Example 26 includes the apparatus of example 25 wherein the data is a data object, the boundary label is associated with the data object and is attached to the data object in the form of data object metadata and the operation includes a plurality of operations, the plurality of operations to be applied to the data object in a sequential manner.

Example 27 includes the apparatus of example 25, wherein the means for applying the operation is to apply the operation to a boundary label, an entity label associated with an entity attempting the data access, and a context in which the data access is being attempted.

Example 28 is a computer-readable medium comprising instructions to perform the method of any of examples 17-24.

Example 29 is an apparatus comprising processing circuitry to perform the method of any of examples 17-24.

Example 30 is a computer-readable medium comprising instructions to perform the method of any of examples 17-24.

Example 31 is an apparatus comprising processing circuitry to perform the method of any of examples 17-24.

Example 32 is a computer-readable medium comprising instructions to perform the method of any of examples 17-24.

Example 33 is an apparatus comprising processing circuitry to perform the method of any of examples 17-24.

The following claims are hereby incorporated into this Detailed Description by this reference, with each claim standing on its own as a separate embodiment of the present disclosure.

The invention claimed is:

1. An apparatus comprising:
   interface circuitry;
   machine-readable instructions; and
   at least one processor circuit to be programmed by the machine-readable instructions to:
      determine that a first data object is restricted to a geographic boundary based on a first geographic boundary label associated with the first data object;
      determine that a request to access the first data object will cause the first data object to cross the geographic boundary;
      extract a sub-part of the first data object based on the sub-part of the first data object not being subject to the geographic boundary;
      create a second data object based on the sub-part of the first data object;
      generate a second geographic boundary label associated with the second data object; and
      grant, based on the second geographic boundary label, access to the second data object across the geographic boundary, the second geographic boundary label to travel in a data flow with the second data object.

2. The apparatus of claim 1, wherein the first geographic boundary label is first geographic boundary metadata associated with the first data object and the second geographic boundary label is second geographic boundary metadata associated with the second data object.

3. The apparatus of claim 2, wherein the first geographic boundary metadata is object geographic boundary metadata, the first data object includes sub-objects, and ones of the sub-objects have respective sub-object geographic boundary metadata.

4. The apparatus of claim 3, wherein one or more of the at least one processor circuit is to apply a function to the object geographic boundary metadata, and to first sub-object geographic boundary metadata of a first sub-object of the sub-objects to determine that a request to access the first sub-object will cause the first sub-object to cross the geographic boundary.

5. The apparatus of claim 1, wherein one or more of the at least one processor circuit is to apply a plurality of operations to the first data object.

6. The apparatus of claim 1, wherein one or more of the at least one processor circuit is to evaluate the first geographic boundary label included with the first data object, an entity label associated with an entity requesting to access the first data object, and a context in which the request to access the first data object is being attempted to determine that the request to access the first data object will cause the first data object to cross the geographic boundary.

7. The apparatus of claim 6, wherein the first geographic boundary label is geographic boundary metadata and the entity label is entity metadata, and one or more of the at least one processor circuit to evaluate the first geographic boundary label, the entity label, and the context by applying a function to the geographic boundary metadata, the entity metadata, and the context.

8. The apparatus of claim 1, wherein the sub-part of the first data object is a first sub-part of the first data object, the first data object including a second sub-part, and one or more of the at least one processor circuit is to:
   determine the second sub-part is subject to the geographic boundary; and
   deny access to the second sub-part.

9. The apparatus of claim 1, wherein the geographic boundary corresponds to a first condition, one or more of the at least one processor circuit is to determine that at least a second condition associated with the sub-part of the first data object is satisfied before the sub-part of the first data object is permitted to cross the geographic boundary.

10. A non-transitory machine readable medium comprising instructions to cause at least one processor circuit to at least:
   determine that a first data object is associated with a geographic boundary based on a first geographic boundary label associated with the first data object;
   determine that a request to access the first data object will cause the first data object to cross the geographic boundary;
   extract a part of the first data object based on the part of the first data object not being subject to the geographic boundary;
   create a second data object based on the part of the first data object;
   generate a second geographic boundary label associated with the second data object; and
   grant, based on the second geographic boundary label, access to the second data object across the geographic boundary, the second geographic boundary label to travel in a data flow with the second data object.

11. The non-transitory machine readable medium of claim 10, wherein the first geographic boundary label is associated with the first data object and is attached to the first data object as metadata.

12. The non-transitory machine readable medium of claim 11, wherein the metadata for the first data object is object geographic boundary metadata, the first data object includes sub-objects, and ones of the sub-objects have respective sub-object geographic boundary metadata.

13. The non-transitory machine readable medium of claim 12, wherein the instructions are to cause one or more of the at least one processor circuit to:
   apply a function to the object geographic boundary metadata to determine that the request to access the first data object will cause the first data object to cross the geographic boundary, and
   apply the function to first sub-object geographic boundary metadata of a first sub-object of the sub-objects to determine that a request to access the first sub-object will cause the first sub-object to cross the geographic boundary.

14. The non-transitory machine readable medium of claim 10, wherein the instructions are to cause one or more of the at least one processor circuit to apply a plurality of operations to the first data object.

15. The non-transitory machine readable medium of claim 10, wherein the instructions are to cause one or more of the at least one processor circuit to determine that the request to access the first data object will cause the first data object to cross the geographic boundary by evaluating: the first geographic boundary label, an entity label associated with an entity requesting to access the first data object, and a context in which the request to access the first data object is being attempted.

16. The non-transitory machine readable medium of claim 15, wherein the first geographic boundary label is geographic boundary metadata, the entity label is entity metadata, and the instructions are to cause one or more of the at least one processor circuit to apply a function to the geographic boundary metadata, the entity metadata, and the context to determine that the request to access the first data object will cause the first data object to cross the geographic boundary.

17. A method comprising:
determining that a request to access a first data object will cause the first data object to cross a first geographic boundary based on a first geographic boundary label, the first data object restricted from crossing the first geographic boundary;
extracting, by at least one processor circuit programmed by at least one instruction, a first sub-object of the first data object based on the first sub-object of the first data object corresponding to a second geographic boundary;
creating, by one or more of the at least one processor circuit, a second data object based on the first sub-object;
generating a second geographic boundary label associated with the second data object; and
granting, based on the second geographic boundary label, access to the second data object across the first geographic boundary, the second geographic boundary label to travel in a data flow with the second data object.

18. The method of claim 17, wherein the first geographic boundary label is associated with the first data object and is attached to the first data object in metadata.

19. The method of claim 18, wherein the metadata for the first data object is object geographic boundary metadata, the first data object includes a plurality of sub-objects, and ones of the sub-objects have respective sub-object geographic boundary metadata.

20. The method of claim 19, wherein the determining that the request to access the first data object will cause the first data object to cross the first geographic boundary includes applying a function to the object geographic boundary metadata, and to second sub-object geographic boundary metadata of a second sub-object of the plurality of sub-objects to determine that a request to access the second sub-object will cause the second sub-object to cross the first geographic boundary.

21. The method of claim 17, wherein the determining that the request to access the first data object will cause the first data object to cross the first geographic boundary includes evaluating: the first geographic boundary label, an entity label associated with an entity requesting to access the first data object, and a context in which the request to access the first data object is being attempted.

22. The method of claim 21, wherein the first geographic boundary label is geographic boundary metadata, the entity label is entity metadata, and wherein the determining that the request to access the first data object will cause the first data object to cross the first geographic boundary includes applying a function to the geographic boundary metadata, the entity metadata, and the context.

23. An apparatus comprising:
means for determining that a request to access a first data object will cause the first data object to cross a geographic boundary based on a first geographic boundary label associated with the first data object, the first data object restricted by the geographic boundary;
means for extracting a part of the first data object based on the part of the first data object not being subject to the geographic boundary;
means for creating a second data object based on the part of the first data object;
generate a second geographic boundary label associated with the second data object; and
means for granting, based on the second geographic boundary label, access to the second data object across the geographic boundary, the second geographic boundary label to travel in a data flow with the second data object.

* * * * *